US012276755B2

(12) United States Patent
Bao et al.

(10) Patent No.: US 12,276,755 B2
(45) Date of Patent: *Apr. 15, 2025

(54) 2D SCANNING HIGH PRECISION LIDAR USING COMBINATION OF ROTATING CONCAVE MIRROR AND BEAM STEERING DEVICES

(71) Applicant: Innovusion, Inc., Sunnyvale, CA (US)

(72) Inventors: Junwei Bao, Los Altos, CA (US); Yimin Li, Cupertino, CA (US); Rui Zhang, Palo Alto, CA (US)

(73) Assignee: SEYOND, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,647

(22) Filed: Jan. 27, 2023

(65) Prior Publication Data
US 2023/0194668 A1 Jun. 22, 2023

Related U.S. Application Data

(60) Continuation of application No. 17/169,366, filed on Feb. 5, 2021, which is a division of application No. (Continued)

(51) Int. Cl.
*G01S 7/481* (2006.01)
*G01S 17/10* (2020.01)
(Continued)

(52) U.S. Cl.
CPC .......... *G01S 7/4812* (2013.01); *G01S 7/4816* (2013.01); *G01S 7/4817* (2013.01); *G01S 17/10* (2013.01);
(Continued)

(58) Field of Classification Search
None
See application file for complete search history.

(56) References Cited

U.S. PATENT DOCUMENTS 3,122,330 A  2/1964 Trentini
3,854,821 A  12/1974 Thompson
(Continued)

FOREIGN PATENT DOCUMENTS

AT  3688 U1  6/2000
CN  1677050 A  10/2005
(Continued)

OTHER PUBLICATIONS

"Mirrors", Physics LibreTexts, https://phys.libretexts.org/Bookshelves/Optics/Supplemental_Modules_(Components)/Mirrors, (2021), 2 pages.
(Continued)

*Primary Examiner* — Eric L Bolda
(74) *Attorney, Agent, or Firm* — MASCHOFF BRENNAN; Liang Huang

(57) ABSTRACT

The present disclosure describes a system and method for coaxial LiDAR scanning. The system includes a first light source configured to provide first light pulses. The system also includes one or more beam steering apparatuses optically coupled to the first light source. Each beam steering apparatus comprises a rotatable concave reflector and a light beam steering device disposed at least partially within the rotatable concave reflector. The combination of the light beam steering device and the rotatable concave reflector, when moving with respect to each other, steers the one or more first light pulses both vertically and horizontally to illuminate an object within a field-of-view; obtain one or more first returning light pulses, the one or more first returning light pulses being generated based on the steered first light pulses illuminating an object within the field-of-view, and redirects the one or more first returning light pulses.

23 Claims, 22 Drawing Sheets

Related U.S. Application Data

15/721,127, filed on Sep. 29, 2017, now Pat. No. 10,942,257.

(60) Provisional application No. 62/529,955, filed on Jul. 7, 2017, provisional application No. 62/441,280, filed on Dec. 31, 2016.

(51) Int. Cl.
*G01S 17/42* (2006.01)
*G01S 17/88* (2006.01)
*G01S 17/931* (2020.01)
*G02B 19/00* (2006.01)
*G02B 26/12* (2006.01)

(52) U.S. Cl.
CPC .............. *G01S 17/42* (2013.01); *G01S 17/88* (2013.01); *G01S 17/931* (2020.01); *G02B 19/0028* (2013.01); *G02B 19/0076* (2013.01); *G02B 26/12* (2013.01); *G02B 26/124* (2013.01); *G02B 26/125* (2013.01); *G02B 26/126* (2013.01)

(56) References Cited

U.S. PATENT DOCUMENTS

| | | | |
|---|---|---|---|
| 3,897,150 A | 7/1975 | Bridges et al. | |
| 4,412,720 A | 11/1983 | Costa | |
| 4,464,048 A | 8/1984 | Farlow | |
| 4,710,621 A | 12/1987 | Loy | |
| 4,733,072 A | 3/1988 | Lettington | |
| 4,923,263 A | 5/1990 | Johnson | |
| 5,006,721 A | 4/1991 | Cameron et al. | |
| 5,157,451 A | 10/1992 | Taboada et al. | |
| 5,303,084 A | 4/1994 | Pflibsen et al. | |
| 5,319,434 A | 6/1994 | Croteau et al. | |
| 5,369,661 A | 11/1994 | Yamaguchi et al. | |
| 5,371,608 A | 12/1994 | Muto et al. | |
| 5,442,358 A | 8/1995 | Keeler et al. | |
| 5,475,207 A | 12/1995 | Bobba et al. | |
| 5,510,890 A | 4/1996 | Langdon et al. | |
| 5,546,188 A * | 8/1996 | Wangler .................. G01S 17/14 356/601 |
| 5,579,153 A | 11/1996 | Laming et al. | |
| 5,600,487 A | 2/1997 | Kiyomoto et al. | |
| 5,614,961 A | 3/1997 | Gibeau et al. | |
| 5,657,077 A | 8/1997 | Deangelis et al. | |
| 5,682,225 A | 10/1997 | DuBois et al. | |
| 5,736,958 A | 4/1998 | Turpin | |
| 5,742,068 A | 4/1998 | Dybdahl et al. | |
| 5,793,491 A | 8/1998 | Wangler et al. | |
| 5,838,239 A | 11/1998 | Stern et al. | |
| 5,864,391 A | 1/1999 | Hosokawa et al. | |
| 5,926,259 A | 7/1999 | Bamberger et al. | |
| 5,936,756 A | 8/1999 | Nakajima | |
| 6,163,378 A | 12/2000 | Khoury | |
| 6,175,440 B1 | 1/2001 | Conemac | |
| 6,317,202 B1 | 11/2001 | Hosokawa et al. | |
| 6,361,324 B1 | 2/2002 | Flint | |
| 6,420,698 B1 | 7/2002 | Dimsdale | |
| 6,594,000 B2 | 7/2003 | Green et al. | |
| 6,650,404 B1 | 11/2003 | Crawford | |
| 6,650,407 B2 | 11/2003 | Jamieson et al. | |
| 6,783,074 B1 | 8/2004 | Hammer | |
| 6,788,445 B2 | 9/2004 | Goldberg et al. | |
| 6,788,861 B1 | 9/2004 | Utsui et al. | |
| 6,864,498 B2 | 3/2005 | Katzir et al. | |
| 6,950,733 B2 | 9/2005 | Stopczynski | |
| 7,128,267 B2 | 10/2006 | Reichenbach et al. | |
| 7,202,941 B2 | 4/2007 | Munro | |
| 7,323,987 B2 | 1/2008 | Seas et al. | |
| 7,345,271 B2 | 3/2008 | Boehlau et al. | |
| 7,382,442 B2 | 6/2008 | Adachi et al. | |
| 7,405,676 B2 | 7/2008 | Janssen | |
| 7,440,084 B2 | 10/2008 | Kane | |
| 7,440,175 B2 | 10/2008 | Di et al. | |
| 7,489,865 B2 | 2/2009 | Varshneya et al. | |
| 7,541,943 B2 | 6/2009 | Manor | |
| 7,541,944 B2 | 6/2009 | Konya et al. | |
| 7,544,945 B2 | 6/2009 | Tan et al. | |
| 7,576,837 B2 | 8/2009 | Liu et al. | |
| 7,580,117 B2 | 8/2009 | Okada et al. | |
| 7,639,347 B2 | 12/2009 | Eaton | |
| 7,675,655 B2 | 3/2010 | Marshall et al. | |
| 7,679,798 B2 | 3/2010 | Sowa et al. | |
| 7,697,120 B2 | 4/2010 | Reichert et al. | |
| 7,830,527 B2 | 11/2010 | Chen et al. | |
| 7,835,068 B1 | 11/2010 | Brooks et al. | |
| 7,847,235 B2 | 12/2010 | Krupkin et al. | |
| 7,880,865 B2 | 2/2011 | Tanaka et al. | |
| 7,936,448 B2 | 5/2011 | Albuquerque et al. | |
| 7,969,558 B2 | 6/2011 | Hall | |
| 7,982,861 B2 | 7/2011 | Abshire et al. | |
| 8,009,186 B2 | 8/2011 | Tomioka | |
| 8,072,582 B2 | 12/2011 | Meneely | |
| 8,116,968 B2 | 2/2012 | Jou et al. | |
| 8,212,998 B2 | 7/2012 | Rindle | |
| 8,248,272 B2 | 8/2012 | Arnold et al. | |
| 8,299,957 B2 | 10/2012 | Tseng | |
| 8,471,895 B2 | 6/2013 | Banks | |
| 8,526,473 B2 | 9/2013 | Baird et al. | |
| 8,629,977 B2 | 1/2014 | Phillips et al. | |
| 8,659,643 B2 | 2/2014 | Purvis et al. | |
| 8,659,748 B2 | 2/2014 | Dakin et al. | |
| 8,681,319 B2 | 3/2014 | Tanaka et al. | |
| 8,736,818 B2 | 5/2014 | Weimer et al. | |
| 8,749,764 B2 | 6/2014 | Hsu | |
| 8,812,149 B2 | 8/2014 | Doak | |
| 8,836,955 B2 | 9/2014 | Alvarez Diez et al. | |
| 8,842,356 B2 | 9/2014 | Sandner et al. | |
| 8,918,270 B2 | 12/2014 | Wang | |
| 8,976,339 B2 | 3/2015 | Phillips et al. | |
| 8,994,928 B2 | 3/2015 | Shiraishi | |
| 9,048,616 B1 | 6/2015 | Robinson | |
| 9,065,243 B2 | 6/2015 | Asobe et al. | |
| 9,086,273 B1 | 7/2015 | Gruver et al. | |
| 9,188,674 B2 | 11/2015 | Suzuki et al. | |
| 9,194,701 B2 | 11/2015 | Bosch | |
| 9,239,959 B1 | 1/2016 | Evans et al. | |
| 9,255,790 B2 | 2/2016 | Zhu | |
| 9,285,477 B1 | 3/2016 | Smith et al. | |
| 9,300,321 B2 | 3/2016 | Zalik et al. | |
| 9,304,316 B2 | 4/2016 | Weiss et al. | |
| 9,316,724 B2 | 4/2016 | Gehring et al. | |
| 9,354,485 B2 | 5/2016 | Fermann et al. | |
| 9,476,968 B2 | 10/2016 | Anderson et al. | |
| 9,477,007 B2 | 10/2016 | Albert et al. | |
| 9,510,505 B2 | 12/2016 | Halloran et al. | |
| 9,575,184 B2 | 2/2017 | Gilliland et al. | |
| 9,605,998 B2 | 3/2017 | Nozawa | |
| 9,606,222 B2 | 3/2017 | Bayha et al. | |
| 9,618,742 B1 | 4/2017 | Droz et al. | |
| 9,621,876 B2 | 4/2017 | Federspiel | |
| 9,625,580 B2 | 4/2017 | Kotelnikov et al. | |
| 9,638,799 B2 | 5/2017 | Goodwin et al. | |
| 9,671,094 B2 | 6/2017 | Ball | |
| 9,696,426 B2 | 7/2017 | Zuk | |
| 9,702,966 B2 | 7/2017 | Batcheller et al. | |
| 9,753,351 B2 | 9/2017 | Eldada | |
| 9,778,364 B2 | 10/2017 | Gruver et al. | |
| 9,791,555 B2 | 10/2017 | Zhu | |
| 9,798,003 B2 | 10/2017 | Hammes et al. | |
| 9,804,264 B2 | 10/2017 | Villeneuve et al. | |
| 9,810,786 B1 | 11/2017 | Welford et al. | |
| 9,812,838 B2 | 11/2017 | Villeneuve et al. | |
| 9,817,121 B2 | 11/2017 | Inoue et al. | |
| 9,823,351 B2 | 11/2017 | Haslim et al. | |
| 9,823,353 B2 | 11/2017 | Eichenholz et al. | |
| 9,857,468 B1 | 1/2018 | Eichenholz et al. | |
| 9,857,472 B2 | 1/2018 | Mheen et al. | |
| 9,869,753 B2 | 1/2018 | Eldada | |
| 9,869,754 B1 | 1/2018 | Campbell et al. | |
| 9,880,278 B2 | 1/2018 | Uffelen et al. | |

(56) References Cited

U.S. PATENT DOCUMENTS

| | | |
|---|---|---|
| 9,880,283 B2 | 1/2018 | Droz et al. |
| 9,885,778 B2 | 2/2018 | Dussan |
| 9,897,689 B2 | 2/2018 | Dussan |
| 9,915,726 B2 | 3/2018 | Bailey et al. |
| 9,923,329 B2 | 3/2018 | Savage-Leuchs et al. |
| 9,927,915 B2 | 3/2018 | Frame et al. |
| 9,958,545 B2 | 5/2018 | Eichenholz et al. |
| 9,989,755 B2 | 6/2018 | Fujimura et al. |
| 9,995,820 B2 | 6/2018 | Jachmann et al. |
| 10,007,001 B1 | 6/2018 | LaChapelle et al. |
| 10,012,732 B2 | 7/2018 | Eichenholz et al. |
| 10,018,724 B2 | 7/2018 | Royo Royo et al. |
| 10,031,214 B2 | 7/2018 | Rosenzweig et al. |
| 10,035,112 B2 | 7/2018 | Barcikowski et al. |
| 10,042,159 B2 | 8/2018 | Dussan et al. |
| 10,048,381 B2 | 8/2018 | Koehler |
| 10,061,019 B1 | 8/2018 | Campbell et al. |
| 10,073,166 B2 | 9/2018 | Dussan |
| 10,078,133 B2 | 9/2018 | Dussan |
| 10,084,925 B2 | 10/2018 | LaChapelle |
| 10,107,914 B2 | 10/2018 | Kalscheur et al. |
| 10,157,630 B2 | 12/2018 | Vaughn et al. |
| 10,180,517 B2 | 1/2019 | Wiersema |
| 10,191,155 B2 | 1/2019 | Curatu |
| 10,203,399 B2 | 2/2019 | Retterath et al. |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,317,672 B2 | 6/2019 | Sarkar |
| 10,324,170 B1 | 6/2019 | Enberg, Jr. et al. |
| 10,324,171 B2 | 6/2019 | Niclass et al. |
| 10,324,185 B2 | 6/2019 | McWhirter et al. |
| 10,393,877 B2 | 8/2019 | Hall et al. |
| 10,401,482 B2 | 9/2019 | Kienzler et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,595 B2 | 5/2020 | Curatu |
| 10,663,596 B2 | 5/2020 | Dussan et al. |
| 10,684,360 B2 | 6/2020 | Campbell |
| 10,698,110 B2 | 6/2020 | Verheggen et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,022 B2 | 12/2021 | de Mersseman et al. |
| 11,194,048 B1 | 12/2021 | Burbank et al. |
| 2001/0043717 A1 | 11/2001 | Laumeyer et al. |
| 2002/0039221 A1 | 4/2002 | Shiraishi et al. |
| 2002/0136251 A1 | 9/2002 | Green et al. |
| 2002/0149760 A1 | 10/2002 | Hipp |
| 2002/0149761 A1 | 10/2002 | Saccomanno |
| 2003/0066954 A1 | 4/2003 | Hipp |
| 2003/0080285 A1 | 5/2003 | Hipp |
| 2004/0062442 A1 | 4/2004 | Laumeyer et al. |
| 2004/0135992 A1 | 7/2004 | Munro |
| 2005/0033497 A1 | 2/2005 | Stopczynski |
| 2005/0034036 A1 | 2/2005 | Lages et al. |
| 2005/0088641 A1 | 4/2005 | Hung et al. |
| 2005/0190424 A1 | 9/2005 | Reichenbach et al. |
| 2005/0195383 A1 | 9/2005 | Breed et al. |
| 2005/0218128 A1 | 10/2005 | Han |
| 2006/0071846 A1 | 4/2006 | Yanagisawa et al. |
| 2006/0132752 A1 | 6/2006 | Kane |
| 2006/0227317 A1 | 10/2006 | Henderson et al. |
| 2007/0024840 A1 | 2/2007 | Fetzer et al. |
| 2007/0091948 A1 | 4/2007 | Di et al. |
| 2007/0216995 A1 | 9/2007 | Bollond et al. |
| 2007/0248136 A1 | 10/2007 | Leonardo et al. |
| 2008/0123170 A1 | 5/2008 | Reichert et al. |
| 2008/0174762 A1 | 7/2008 | Liu et al. |
| 2008/0193135 A1 | 8/2008 | Du et al. |
| 2008/0210881 A1 | 9/2008 | Harris et al. |
| 2008/0218821 A1 | 9/2008 | Dalgleish et al. |
| 2008/0247425 A1 | 10/2008 | Welford |
| 2008/0264164 A1 | 10/2008 | Solheim et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0099813 A1 | 4/2009 | Dimsdale et al. |
| 2009/0102313 A1 | 4/2009 | West et al. |
| 2009/0102828 A1 | 4/2009 | Arai et al. |
| 2009/0147239 A1 | 6/2009 | Zhu |
| 2009/0252376 A1 | 10/2009 | Retterath et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0007870 A1 | 1/2010 | Haberer et al. |
| 2010/0020306 A1 | 1/2010 | Hall |
| 2010/0020377 A1 | 1/2010 | Borchers et al. |
| 2010/0025798 A1 | 2/2010 | Itzler et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0097678 A1 | 4/2010 | Hajjar et al. |
| 2010/0114416 A1 | 5/2010 | Au et al. |
| 2010/0128109 A1 | 5/2010 | Banks |
| 2010/0165082 A1 | 7/2010 | Kiehn et al. |
| 2010/0208235 A1 | 8/2010 | Kaehler |
| 2010/0245849 A1 | 9/2010 | Satzky et al. |
| 2010/0128248 A1 | 10/2010 | Heizmann et al. |
| 2010/0271614 A1 | 10/2010 | Albuquerque et al. |
| 2010/0302528 A1 | 12/2010 | Hall |
| 2011/0032508 A1 | 2/2011 | Ludwig et al. |
| 2011/0085155 A1 | 4/2011 | Stann et al. |
| 2011/0102764 A1 | 5/2011 | Walsh et al. |
| 2011/0122895 A1 | 5/2011 | Savage-Leuchs et al. |
| 2011/0161031 A1 | 6/2011 | Dimsdale et al. |
| 2011/0181864 A1 | 7/2011 | Schmitt et al. |
| 2011/0216304 A1 | 9/2011 | Hall |
| 2011/0235019 A1 | 9/2011 | Matsubara et al. |
| 2012/0035788 A1 | 2/2012 | Trepagnier et al. |
| 2012/0038903 A1 | 2/2012 | Weimer et al. |
| 2012/0101680 A1 | 4/2012 | Trepagnier et al. |
| 2012/0124113 A1 | 5/2012 | Zalik et al. |
| 2012/0162373 A1 | 6/2012 | Mheen et al. |
| 2012/0219020 A1 | 8/2012 | Fermann et al. |
| 2012/0221142 A1 | 8/2012 | Doak |
| 2013/0050676 A1 | 2/2013 | d'Aligny |
| 2013/0087689 A1 | 4/2013 | Woodward et al. |
| 2013/0107016 A1 | 5/2013 | Federspiel |
| 2013/0116971 A1 | 5/2013 | Retkowski et al. |
| 2013/0235366 A1 | 8/2013 | Giacotto et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0027607 A1 | 1/2014 | Mordarski et al. |
| 2014/0035959 A1 | 2/2014 | Lapstun |
| 2014/0063255 A1 | 3/2014 | Breed |
| 2014/0063489 A1 | 3/2014 | Steffey et al. |
| 2014/0078514 A1 | 3/2014 | Zhu |
| 2014/0104594 A1 | 4/2014 | Gammenthaler |
| 2014/0171523 A1 | 6/2014 | Lau et al. |
| 2014/0233942 A1 | 8/2014 | Kanter |
| 2014/0300952 A1 | 10/2014 | Gusev et al. |

(56) References Cited

U.S. PATENT DOCUMENTS

| | | |
|---|---|---|
| 2014/0319638 A1 | 10/2014 | Chia |
| 2014/0320845 A1 | 10/2014 | Bayha et al. |
| 2014/0332676 A1 | 11/2014 | Bayha et al. |
| 2014/0347650 A1 | 11/2014 | Bosch |
| 2014/0350836 A1 | 11/2014 | Stettner et al. |
| 2015/0015868 A1 | 1/2015 | Jachman et al. |
| 2015/0055117 A1 | 2/2015 | Pennecot et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0124238 A1 | 5/2015 | Sakai et al. |
| 2015/0139259 A1 | 5/2015 | Robinson |
| 2015/0153271 A1 | 6/2015 | Retterath et al. |
| 2015/0158489 A1 | 6/2015 | Oh et al. |
| 2015/0266472 A1 | 9/2015 | Ferguson et al. |
| 2015/0293228 A1 | 10/2015 | Retterath et al. |
| 2015/0332102 A1 | 11/2015 | Lu et al. |
| 2015/0338270 A1 | 11/2015 | Williams et al. |
| 2015/0355327 A1 | 12/2015 | Goodwin et al. |
| 2015/0378012 A1 | 12/2015 | Sayyah et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0047902 A1 | 2/2016 | Ishikawa et al. |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0191870 A1 | 6/2016 | Hajjar et al. |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0070029 A1 | 3/2017 | Moeneclaey et al. |
| 2017/0131388 A1 | 5/2017 | Campbell et al. |
| 2017/0153319 A1 | 6/2017 | Villeneuve et al. |
| 2017/0168145 A1 | 6/2017 | Sakabe |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0020115 A1 | 1/2018 | Hipp |
| 2018/0040171 A1 | 2/2018 | Kundu et al. |
| 2018/0050704 A1 | 2/2018 | Tascione et al. |
| 2018/0059221 A1 | 3/2018 | Slobodyanyuk et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0217262 A1 | 8/2018 | Albelo et al. |
| 2018/0275274 A1 | 9/2018 | Bao et al. |
| 2018/0284237 A1 | 10/2018 | Campbell et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0011567 A1 | 1/2019 | Pacala et al. |
| 2019/0025428 A1 | 1/2019 | Li et al. |
| 2019/0094345 A1 | 3/2019 | Singer et al. |
| 2019/0101645 A1 | 4/2019 | Demersseman et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0250270 A1 | 8/2019 | Suzuki et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0026071 A1 | 1/2020 | Bao et al. |
| 2020/0142070 A1 | 5/2020 | Hall et al. |
| 2020/0142073 A1 | 5/2020 | Gassend et al. |
| 2020/0142074 A1 | 5/2020 | Huber et al. |
| 2020/0142075 A1 | 5/2020 | Lee |
| 2020/0142076 A1 | 5/2020 | Gulo et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 1770211 A | 5/2006 |
| CN | 1946986 A | 4/2007 |
| CN | 1322307 C | 6/2007 |
| CN | 101093285 A | 12/2007 |
| CN | 101231383 A | 7/2008 |
| CN | 101241182 A | 8/2008 |
| CN | 101246216 A | 8/2008 |
| CN | 201251669 Y | 6/2009 |
| CN | 101576620 A | 11/2009 |
| CN | 101641613 A | 2/2010 |
| CN | 101813778 A | 8/2010 |
| CN | 102083359 A | 6/2011 |
| CN | 102736075 A | 10/2012 |
| CN | 102971657 A | 3/2013 |
| CN | 103293530 A | 9/2013 |
| CN | 103403577 A | 11/2013 |
| CN | 103954971 A | 7/2014 |
| CN | 104914448 A | 9/2015 |
| CN | 105093235 A | 11/2015 |
| CN | 204758260 U | 11/2015 |
| CN | 105143820 A | 12/2015 |
| CN | 204885804 U | 12/2015 |
| CN | 105319555 A | 2/2016 |
| CN | 107076838 A | 8/2017 |
| CN | 107450060 A | 12/2017 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |

(56) References Cited

FOREIGN PATENT DOCUMENTS

| | | |
|---|---|---|
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 19757848 A1 | 7/1999 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| GB | 2487518 A | 7/2012 |
| JP | S5085346 A | 7/1975 |
| JP | H04223422 A | 8/1992 |
| JP | 09-287943 A | 11/1997 |
| JP | 2001-012943 A | 1/2001 |
| JP | 2007144667 A | 6/2007 |
| JP | 2007301756 A | 11/2007 |
| JP | 2008070159 A | 3/2008 |
| JP | 2008298520 A | 12/2008 |
| JP | 2009121836 A | 6/2009 |
| JP | 2010035385 A | 2/2010 |
| JP | 2010038859 A | 2/2010 |
| JP | 2010060309 A | 3/2010 |
| JP | 2011257193 A | 12/2011 |
| JP | 2012211831 A | 11/2012 |
| JP | 2013238440 A | 11/2013 |
| JP | 2014071038 A | 4/2014 |
| JP | 2016040662 A | 3/2016 |
| JP | 2017-003347 | 1/2017 |
| JP | 2017-015404 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 9222109 A1 | 12/1992 |
| WO | 2007095329 A2 | 8/2007 |
| WO | 2012051700 A1 | 4/2012 |
| WO | 2016002776 A1 | 1/2016 |
| WO | 2016056545 A1 | 4/2016 |
| WO | 2016175395 A2 | 11/2016 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

"Why Wavelengths Matter in Fiber Optics", FirstLight, https://www.firstlight.net/why-wavelengths-matter-in-fiber-optics/, (2021), 5 pages.

International Search Report & Written Opinion received for PCT Patent Application No. PCT/US2017/067701, mailed Mar. 9, 2018, 15 pages.

Office Action issued in Japanese Patent Application No. 2018-554580 dated Oct. 25, 2019, 13 pages.

Office Action issued in Korean Patent Application No. 10-2018-7030223 dated Jun. 20, 2019, 20 pages.

Office Action issued in Korean Patent Application No. 10-2020-7022102 dated Mar. 16, 2021, 8 pages.

Office Action issued in Japanese Patent Application No. 2020-153958 dated Mar. 19, 2021, 7 pages.

Office Action issued in Chinese Patent Application No. 2017800032023 dated Jun. 9, 2021, 18 pages.

Da-Peng, F. et al., "Overview of beam steering technology based on rotational double prisms," Chinese Optics, vol. 6, No. 2, 2013, pp. 136-150.

Noguchi, H. et al., "Capturing device for dense point cloud of indoor people using horizontal LIDAR and pan rotation of vertical LIDAR with mirrors," 2012 IEEE/SICE International Symposium on System Integration (SII), Fukuoka, Japan, 2012, pp. 428-433.

Office Action issued in German Application No. 11 2017 000 127.7 dated Dec. 21, 2021, 19 pages.

Office Action issued in Chinese Patent Application No. 202210285659.0 dated Aug. 31, 2022, 12 pages.

Office Action issued in Japanese Patent Application No. 2021-110848 dated Oct. 6, 2022, 10 pages.

Office Action issued issued in Japanese Patent Application No. 2021-110848 dated Apr. 26, 2022, 16 pages.

Rodriguez, et al., "Multi-beam and single-chip LIDAR with discrete beam steering by digital micromirror device," Proc. SPIE 10526, Physics and Simulation of Optoelectronic Devices XXVI, 105260U (Feb. 23, 2018); doi: 10.1117/12.2287485, SPIE OPTO, 2018, San Francisco, California, United States, 7 pages.

Office Action issued in Chinese Patent Application No. 2022102717564 dated Nov. 29, 2022, 20 pages.

Office Action issued in Korean Patent Application No. 10-2022-7026144 dated Oct. 31, 2022, 10 pages.

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

(56) References Cited

OTHER PUBLICATIONS

International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LiDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
Office Action including Search Report received for Chinese Patent Application No. 202210305300.5, mailed on Nov. 13, 2024, 16 pages (8 pages of English Translation and 8 pages of Original Document).
Office Action received for Chinese Patent Application No. 202210305310.9, mailed on Nov. 16, 2024, 12 pages (6 pages of English Translation and 6 pages of Original Document).
Office Action received for Chinese Patent Application No. 202210304284.8, mailed on Nov. 30, 2024, 9 pages English translation only.
Zhugeng, D., et al., "Method of removing pits of canopy height model from airborne laser radar", Transactions of the Chinese Society of Agricultural Engineering, vol. 30, No. 21, Nov. 1, 2014, pp. 209-217.
Office Action including Search Report received for Chinese Patent Application No. 202210305374.9, mailed on Dec. 31, 2024, 22 pages (11 pages of English Translation and 11 pages of Original Document).
Office Action received for Chinese Patent Application No. 202210304296.0, mailed on Jan. 22, 2025, 22 pages (11 pages of English Translation and 11 pages of Original Document).
Office Action received for Chinese Patent Application No. 202210321533.4, mailed on Jan. 15, 2025, 18 pages (9 pages of English Translation and 9 pages of Original Document).

\* cited by examiner

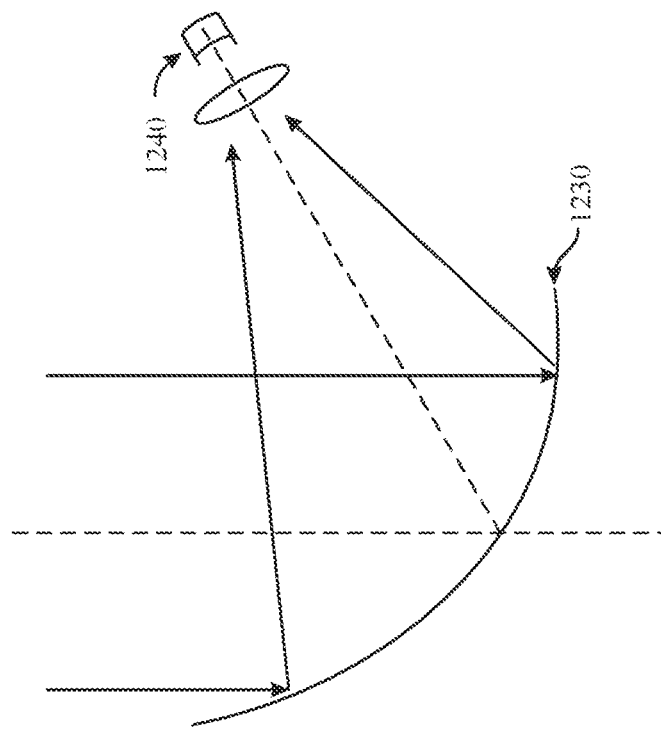
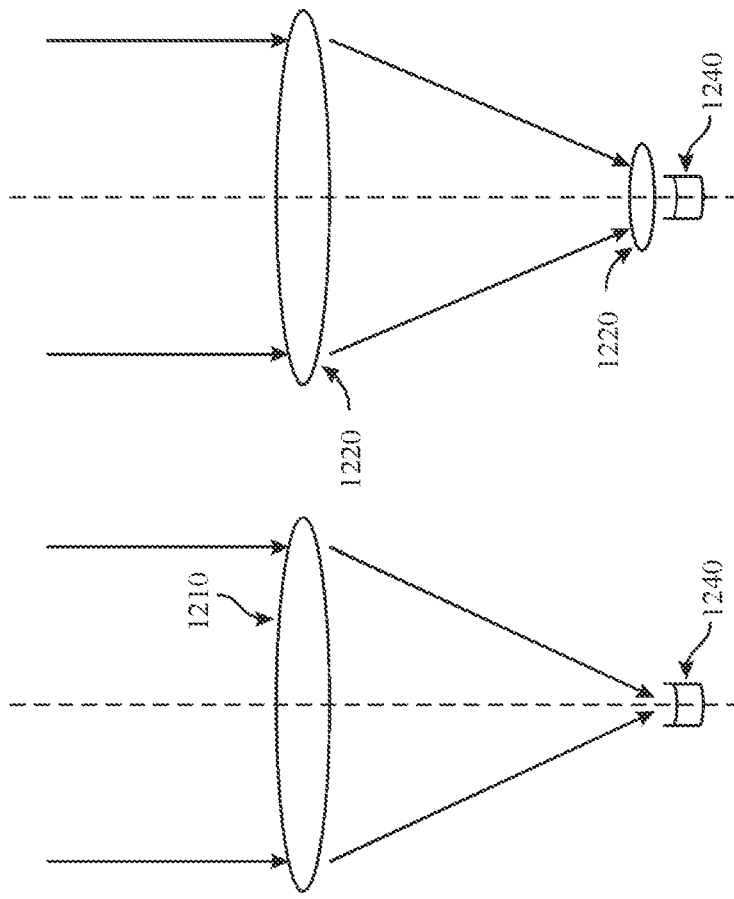

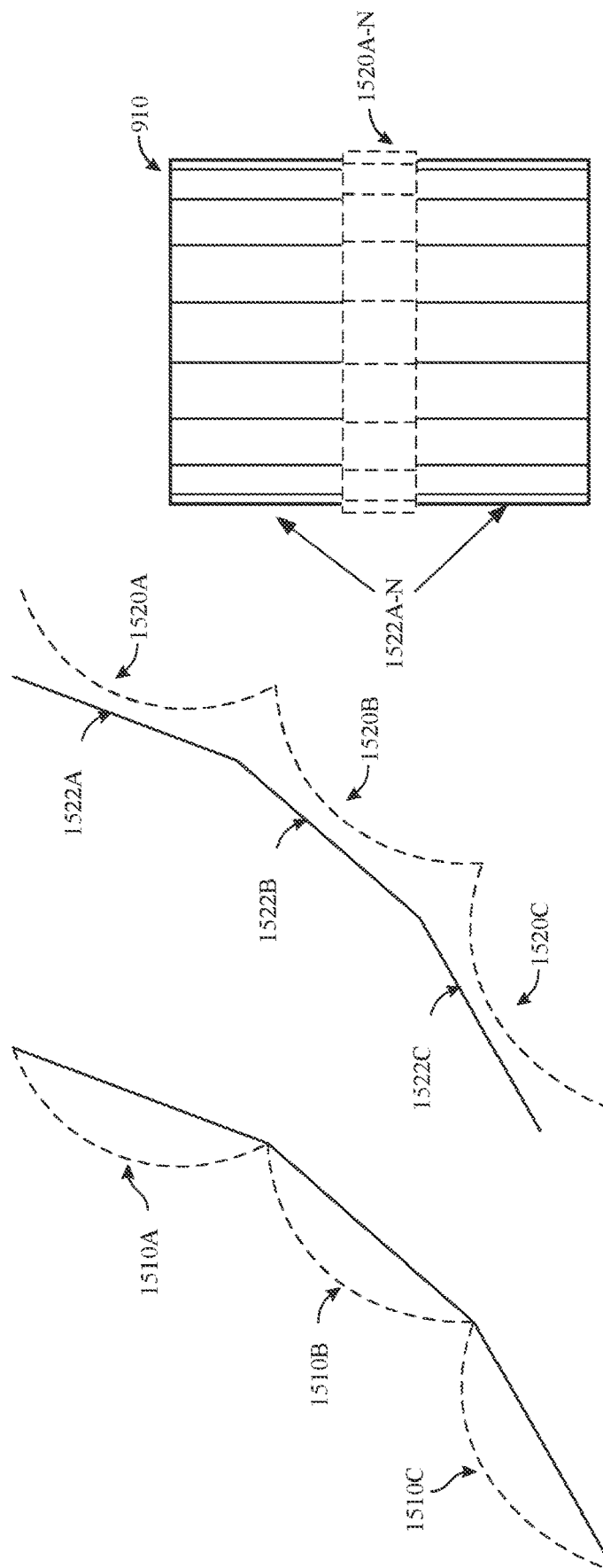

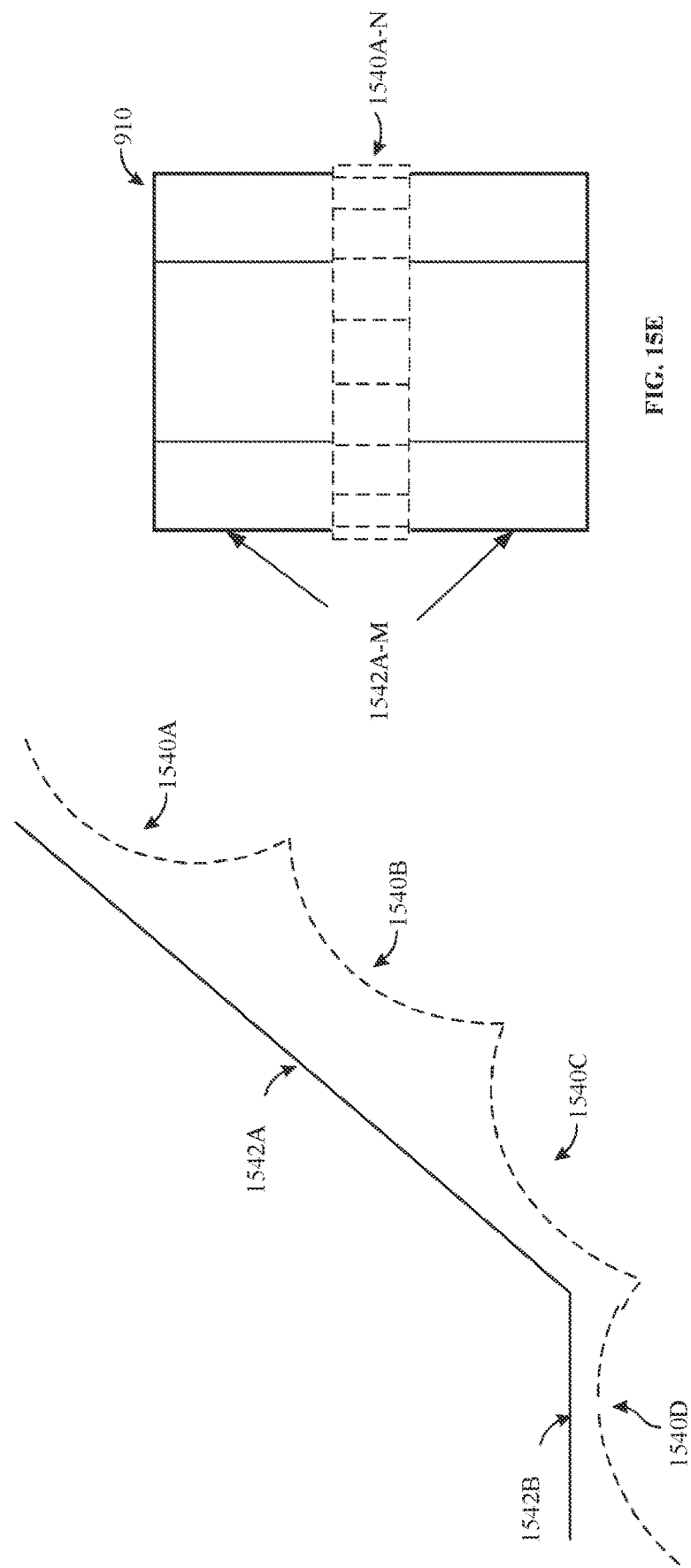

2D SCANNING HIGH PRECISION LIDAR USING COMBINATION OF ROTATING CONCAVE MIRROR AND BEAM STEERING DEVICES

CROSS-REFERENCE TO RELATED APPLICATIONS

This application is a continuation application of U.S. application Ser. No. 17/169,366, filed Feb. 5, 2021, which is a divisional application of U.S. application Ser. No. 15/721,127, filed Sep. 29, 2017, which claims priority to U.S. provisional patent application No. 62/441,280, entitled "COAXIAL INTERLACED RASTER SCANNING SYSTEM FOR LiDAR," filed on Dec. 31, 2016; and U.S. provisional patent application No. 62/529,955, entitled "2D SCANNING HIGH PRECISION LIDAR USING COMBINATION OF ROTATING CONCAVE MIRROR AND BEAM STEERING DEVICES," filed on Jul. 7, 2017. The contents of these applications are hereby incorporated by reference in their entirety for all purposes.

FIELD OF THE DISCLOSURE

The present disclosure generally relates to a light detection and ranging (LiDAR) and, more specifically, to system for scanning consecutive light pulses to illuminate objects in a field-of-view and coaxially collecting the scattered light from each light pulse for ranging the objects in the field-of-view.

BACKGROUND OF THE DISCLOSURE

In order to reduce the size of LiDAR systems there is an effort to implement on-chip micro-electro-mechanical systems (MEMS) to steer pulses of light to illuminate objects in a field-of-view. Such on-chip solutions reduce the size of the LiDAR system. However, these on-chip MEMS designs typically yield an optical aperture cross-section that is a few (less than 5) millimeters or less, which makes it difficult to distinguish a pulse of light reflected by objects at longer distance (e.g., 100 meters) from background noise signals. It has been found that a larger optical aperture cross-section boosts the signal-to-noise ratio for light. However, a typical LiDAR system may be bulky and expensive due to its system configurations. These systems may not be readily integrated with a vehicle and/or may be prohibitively costly to be integrated with a vehicle. Therefore, a high-precision LiDAR system with reduced dimension and cost is desired. Some of the challenges for a high-precision LiDAR system is to reduce the size of LiDAR systems while increasing the cross-section collection optical aperture.

SUMMARY OF THE DISCLOSURE

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) scanning system is provided. The system includes a first light source configured to provide one or more first light pulses. The system also includes one or more beam steering apparatuses optically coupled to the first light source. Each beam steering apparatus comprises a rotatable concave reflector and a light beam steering device disposed at a location such that the light pulses directed by the rotatable concave reflector or the light beam steering device can be further directed to a different direction by the light beam steering device or the rotatable concave reflector. The combination of the light beam steering device and the rotatable concave reflector, when moving with respect to each other, steers the one or more first light pulses both vertically and horizontally to illuminate an object within a field-of-view; obtain one or more first returning light pulses, the one or more first returning light pulses being generated based on the steered first light pulses illuminating an object within the field-of-view, and redirects the one or more first returning light pulses to one or more returning light detectors.

BRIEF DESCRIPTION OF THE DRAWINGS

For a better understanding of the various described aspects, reference should be made to the description below, in conjunction with the following figures in which like-referenced numerals refer to corresponding parts throughout the figures.

FIGS. 12A-12C illustrate exemplary configurations of receiving optic systems, according to examples of the disclosure.

FIGS. 15A-15E illustrates various configurations of multiple facets of exemplary polyhedrons with curved surfaces and flat surfaces, according to examples of the disclosure.

DETAILED DESCRIPTION

Figure 1A:
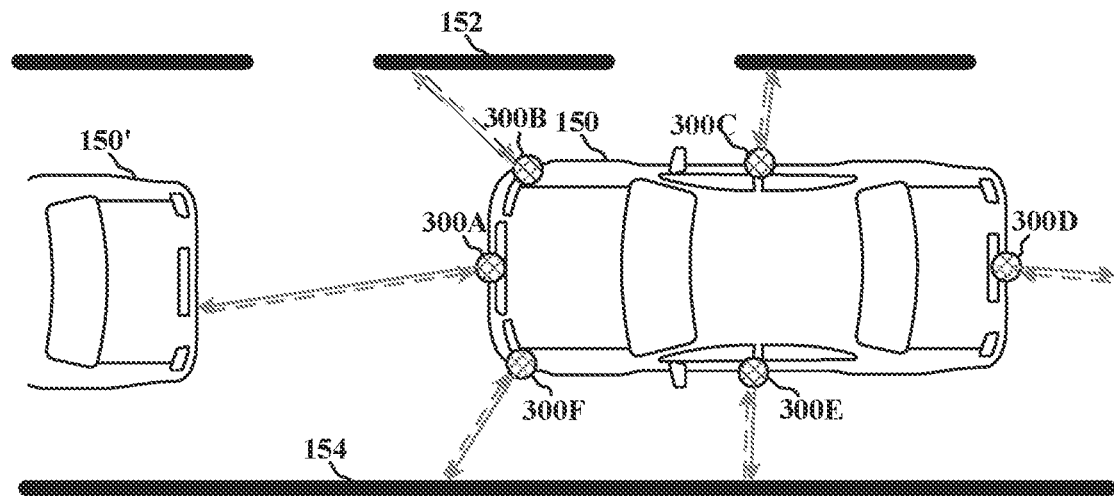
FIG. 1A illustrates a plurality of coaxial LiDAR systems attached to a vehicle.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Examples of LiDAR scanning systems will now be presented with reference to various elements of apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The present disclosure describes a 2D scanning high precision LiDAR system using combination of rotatable concave reflector and light beam steering devices. The LiDAR system includes a beam steering apparatus with a polyhedron reflector situated within the concave reflector that is aligned about a central axis. The concave reflector is configured to spin about the central axis. The polyhedron is configured to spin about a pivot in a direction at an angle (e.g., 90 degrees) to the central axis. The respective instantaneous positions of the concave reflector and the polyhedron steers pulses of light to illuminate objects in a field-of-view, while collecting scattered light from the pulses of light scattered at the objects. Each transmitted pulse of light is substantially coaxial or parallel with the collected scattered light from the corresponding pulse of light. The LiDAR system includes a microcontroller to calculate the distance to the objects based on time differences between each transmitted pulse of light and the collected light from the corresponding pulse of light scattered at the objects. The present disclosure further describes interlacing sub-frames to achieve a higher resolution frame. This technique includes sampling range points to one or more objects across successive horizontal and vertical directions to form one or more sub-frames. The vertical and/or horizontal positions of the sample points for consecutively captured sub-frames are slightly offset, which when combined, provides an interlaced higher density of sampled points. The higher density of sampled points yields a higher resolution for the LiDAR system.

Although the examples of the disclosure are described for integration in a vehicle, other applications are contemplated. For example, the centralized laser delivery system and multiple LiDAR systems can be disposed in or integrated with robots, installed at multiple locations of a building for security monitoring purposes, or installed at traffic intersections or certain location of roads for traffic monitoring, etc.

FIG. 1A illustrates a plurality of LiDAR scanning systems 300A-300F attached to a vehicle 150. LiDAR scanning systems 300A-300F can be 2D scanning LiDAR systems. Each LiDAR scanning systems 300A-300F detects and calculates the range to objects within a field-of-view, which corresponds to locations at and around the vehicle 150. As an example, the LiDAR scanning systems 300A disposed at the front of the vehicle 150 illuminates the adjacent vehicle 150' (and/or other objects) with pulses of light that are collected substantially coaxial with or parallel to the each respective light pulse. The range (e.g., distance) to the adjacent vehicle 150' is determined from the difference in time that each light pulse is transmitted and the scattered light from the corresponding pulse of light is detected.

As in the example depicted in FIG. 1A, the plurality of LiDAR scanning systems 300A-300F are distributed around the vehicle 150 so as to cover the field-of-view between each of the individual coaxial LiDAR system. For example, the field-of-view can be configured such that the LiDAR scanning system 300F can detect the center line 154 on one side of the vehicle 150 and the LiDAR scanning system 300C can detect the lane divider line 152 on the other side of the vehicle 150. In some instances, the field-of-view for one or more of the plurality of LiDAR scanning systems 300A-300F may overlap. For example, the field-of-view of LiDAR scanning system 300B can overlap with that of the LiDAR scanning system 300A. Overlapping of the field-of-view can provide for a higher sampling density. Likewise, the field-of-view of LiDAR scanning systems 300A can overlap with that of the LiDAR scanning systems 300F. Each of the LiDAR scanning systems 300A-300F can include a beam steering apparatus that can steer light pulses both vertically and horizontally to transmitting to a field-of-view to scan objects. The steering of the light pulses enables consecutive sampling of points from one or more objects within the field-of-view.

It should be appreciated that the sizes of the LiDAR scanning systems 300A-300F depicted in FIG. 1A can be relatively small. That is, each respective LiDAR scanning system (e.g., systems 300A-300F) may occupy a space, for example, no larger than 1 cubic foot or ¼ of one cubit foot.

Figure 1B:
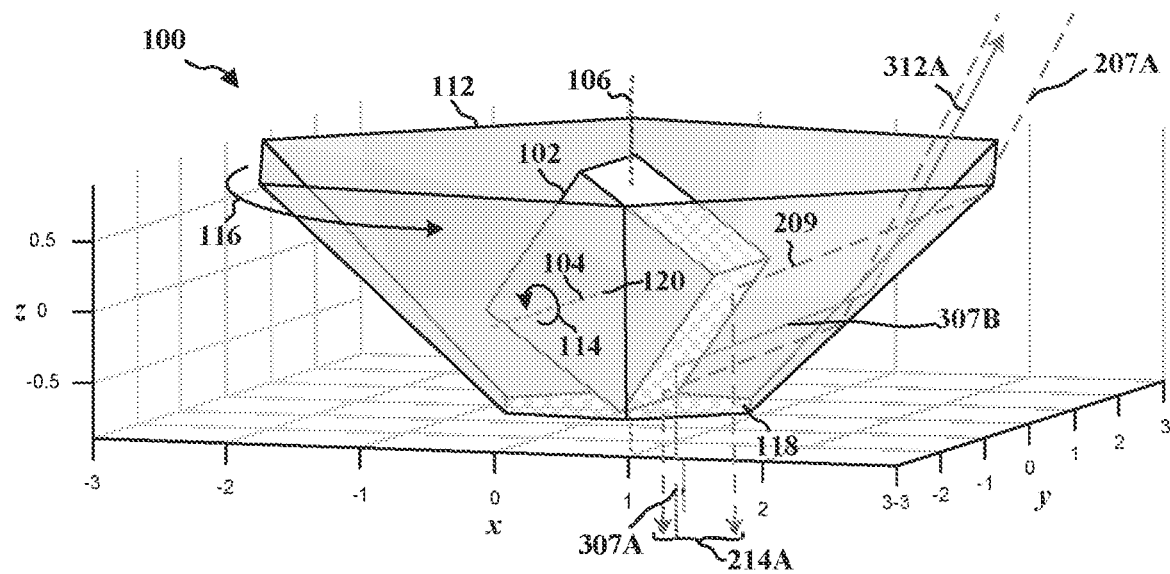
FIG. 1B illustrates an exemplary beam steering apparatus with a polyhedron situated within the concave reflector.

FIG. 1B illustrates an exemplary beam steering apparatus 100 with a light beam steering device (e.g., polyhedron 102) disposed within the concave reflector 112. As depicted in FIG. 1B, in some embodiments, the concave reflector 112 is coaxially aligned (e.g., substantially concentric) with a first axis 106. The concave reflector 112 can include one or more reflective surfaces (e.g., flat-surfaced mirrors) on the concave side that surrounds an aperture 118. The aperture 118 of the concave reflector 112 is coaxially aligned (e.g., substantially concentric) with the first axis 106. In the example depicted in FIG. 1B, mirrors are angled facing inward to form a hex-shaped bowl of the concave reflector 112. In the example depicted in FIG. 1B, the hexagonal aperture 118 of the concave reflector 112 can have a width of one inch across opposing sides of the (e.g., hexagonal) aperture 118 and the reflective surfaces (e.g., mirrors) of the concave reflector 112 can be angled at 45° from the hexagonal aperture 118 with a length of 2.45 inches (along the angled mirrors). In some embodiments, the reflective surfaces (e.g., mirrors) of the concave reflector 112 range between 0.2 inches to 4 inches. In some embodiments, the reflective surfaces of the concave reflector 112 can be curved. In some examples, the curved surfaces project outward (e.g., convex), which may be used to increase the field-of-view of beam steering apparatus 100. In some examples, the curved surfaces project inward (e.g., concave).

As depicted in FIG. 1B, the polyhedron 102 can be disposed within the concave reflector 112. The polyhedron 102 includes a pivot 120 coaxially aligned (e.g., substantially concentric) with a second axis 104, which is perpendicular to the first axis 106. The polyhedron 102 further includes at least one reflective surface (e.g., a mirror) disposed at a face of the polyhedron 102 so as to redirect light between the aperture 118 of the concave reflector 112 and the at least one reflective surface (e.g., a mirror) of the concave reflector 112. For example, light pulses transmitted through aperture 118 toward a reflective surface of polyhedron 102 can be redirected or steered toward a reflective surface of the concave reflector 112, which may be further redirected or steered to the field-of-view. In the example depicted in FIG. 1B, the polyhedron 102 is a cube with six facets. In some examples, the two opposing facets with the pivot 120 have no reflective surfaces (e.g., mirrors) and the remaining four facets have reflective surfaces (e.g., mirrors) directed outward. In the example depicted in FIG. 1B, the cube has an edge length of about 1.22 inches.

It should be appreciated that the polyhedron 102 can have six facets that are not all orthogonal. For example, in some embodiments, the polyhedron 102 can have facets that are asymmetrical, which can offset the vertical and horizontal scanning direction between sub-frames and/or change an interlacing raster pattern. In some examples, the polyhedron 102 is a rhombohedron. It should also be appreciated that the polyhedron 102 can have less than six facets. For example, in some embodiments, the polyhedron 102 is a pentahedron. In such an embodiment, the polyhedron 102 can be a triangular prism with the pivot situated at two opposing triangular facets and one or more reflective surfaces (e.g., mirrors) situated at the rectangular facets. It should also be appreciated that the polyhedron 102 can have more than six facets. For example, the polyhedron 102 can be a hexahedron, a septaheron, an octahedron, etc. In some embodiments, the facets of the polyhedron 102 are curved. In some examples, the curved facets project outward (e.g., convex), which may be used to increase the field-of-view of beam steering apparatus 100. In some examples, the curved facets project inward (e.g., concave), which may reduce the field of view and shape the outgoing laser beam's profile.

In some embodiments, the beam steering apparatus 100 includes one or more motors (not shown) that are operatively coupled to the concave reflector 112 and the polyhedron 102. In this example, the one or more motors can be configured to rotate the concave reflector 112 in a counterclockwise direction (when viewed in the −z direction) around the first axis 106 at a first rotational velocity 116, as depicted in FIG. 1B. The one or more motors can also be configured to rotate the polyhedron 102 about the pivot 120, which is around the second axis 104 in a counterclockwise direction (when viewed in the +y direction) at a second rotational velocity 114. In some embodiments, a rotational controller is configured to control the first rotational velocity 116 of concave reflector 112 and the second rotational velocity 114 of the polyhedron 102. In some instances, the rotational controller is electrically coupled to the one or more motors to control the first rotational velocity 116 of the concave reflector 112 and the second rotational velocity 114 of the polyhedron 102 independently. In some embodiments, the first rotational velocity 116 of the concave reflector 112 is different from the second rotational velocity 114 of the polyhedron 102. For example, the second rotational velocity 114 of the polyhedron 102 may be faster than the first rotational velocity 116 of the concave reflector 112. In the example depicted in FIG. 1B, the second rotational velocity 114 of the polyhedron 102 can be set at 500 revolutions per second (rps), whereas the first rotational velocity 116 of the concave reflector 112 can be set at 10 rps. In some embodiments, the second rotational velocity 114 of the polyhedron 102 may be slower than the first rotational velocity 116 of the concave reflector 112.

In some embodiments, for each sampled point in a scan enabled by the beam steering apparatus 100, the instantaneous positions of the rotating polyhedron 102 with respect to the rotating concave reflector 112 is such that the beam steering apparatus 100 can direct or steer light pulses to an object and collect returning light pulses from the object along a substantially similar optical path. With reference to FIG. 1B, the instantaneous positions of the rotating polyhedron 102 can be measured with respect to the positive z-axis. The angle of the polyhedron 102 is positive when measured from counterclockwise as viewed along the y-axis. The instantaneous positions of the rotating concave reflector 112 can be measured with respect to the negative y-axis. The angle of the concave reflector 112 is positive when measured from clockwise as viewed along the z-axis.

Figure 1C:
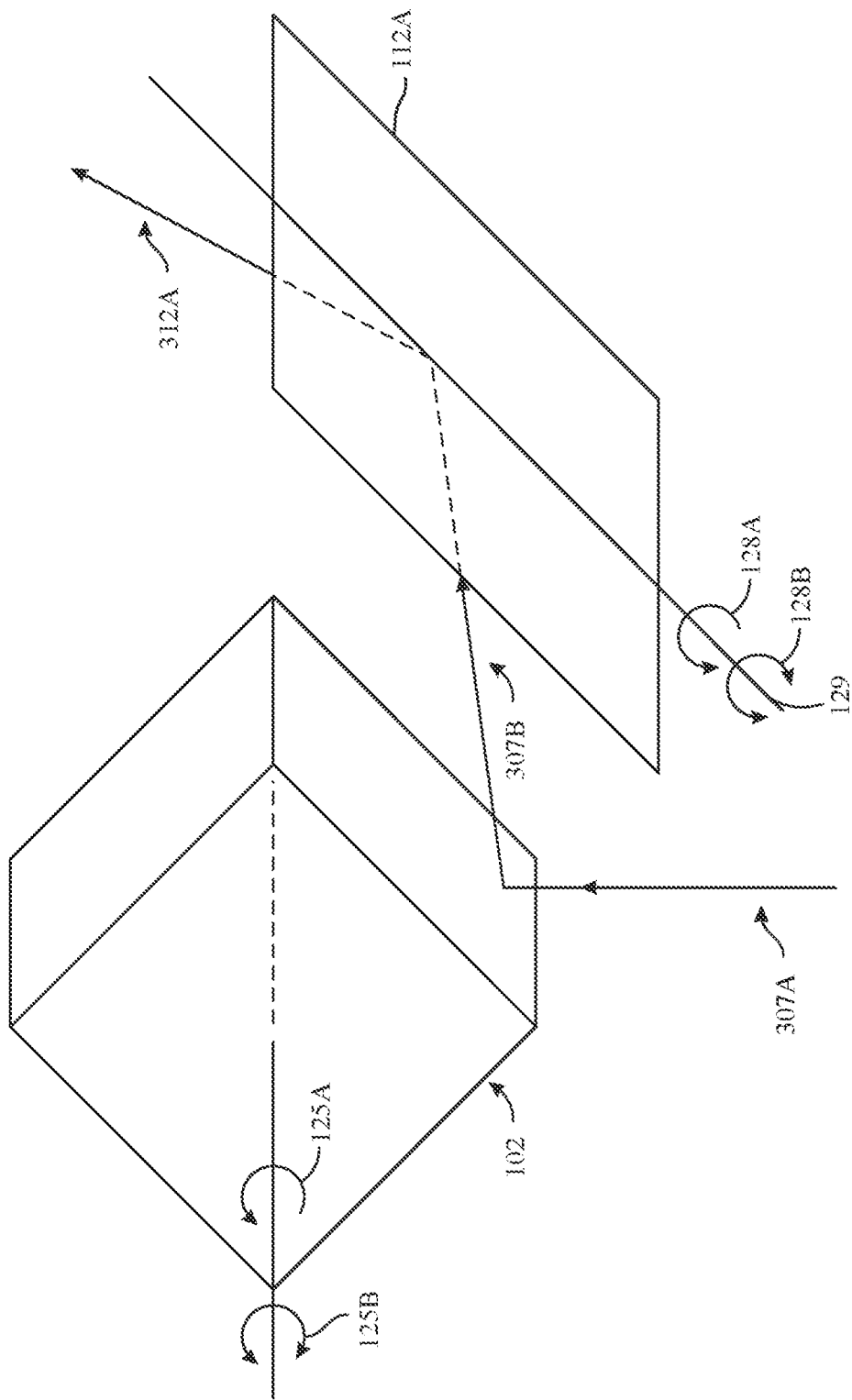
FIG. 1C illustrates an exemplary beam steering apparatus with an oscillation mirror replacing the concave reflector.

It should be appreciated that other mechanisms can be applied that provide for the same effect as rotating the concave reflector 112 and/or as rotating the polyhedron 102. For example, as depicted in FIG. 1C, the concave reflector 112 can be replaced with an oscillating mirror 112A that oscillates along axis 129. As such, rotations of the polyhedron 102 coupled with the oscillating mirror 112A can provide for a similar steering mechanism for scanning consecutive light pulses to illuminate objects in a field-of-view and for collecting the returning light from each light pulse coaxially or in parallel to the illuminating light pulses for ranging the objects in the field-of-view. In another example, the polyhedron 102 can be driven by an actuator that make the polyhedron oscillate back and forth along an axis. In some examples, the oscillation mirror 112A can oscillate about a first axis and the polyhedron 102 can be disposed adjacent to the oscillation mirror 112A, as illustrated in FIG. 1C. The polyhedron 102 can include a pivot that is coaxially aligned with a second axis. The second axis can be disposed at an angle (for example, 90 degrees or 75 degrees) to the first axis. At least one mirror can be disposed at a facet of the polyhedron 102 for reflecting light pulses between the aperture and the concave reflector 112. One or more motors or actuators can be operatively coupled to the oscillation mirror 112A and the polyhedron 102. The one or more motors or actuators can be configured to rotate (illustrated as 128A) or oscillate (illustrated as 128B) the oscillation mirror 112A around the first axis at a first frequency and rotate (illustrated as 125A) or oscillate (illustrated as 125B) the rotatable polyhedron around the second axis at a second frequency.

In the example depicted in FIG. 1B, light pulses 307A obtained from a light source are directed through the aperture 118 towards the polyhedron 102, which generates redirected light pulses 307B by redirecting or reflecting light pulses 307A. The light pulses 307B are directed toward a mirror on the concave reflector 112. The concave reflector 112, in turn, generates steered light pulses 312A by redirecting or reflecting the steered light pulses 307B. The steered light pulses 312A are directed toward the field-of-view to illuminate objects within the field-of-view. The steered light pulses 312A illuminate the objects, which scatters the pulses of light in one or more directions. Some of the pulses of the scattered light returns to the beam steering apparatus 100 as the first returning light pulses 207A. As illustrated in FIG. 1B, in some examples, the first returning light pulses 207A can return to beam steering apparatus 100 (coaxially) along the substantially similar optical path as the steered light pulses 312A. Each of the first returning light pulses 207A can be redirected or reflected by the concave reflector 112 to generate redirected returning light pulses 209. Redirected returning light pulses 209 are directed toward polyhedron 102, which in turn redirects and reflects the light pulses to generate redirected returning light pulses 214A. Redirected returning light pulses 214A are directed back through the aperture 118 to a light detector.

Figure 2A:
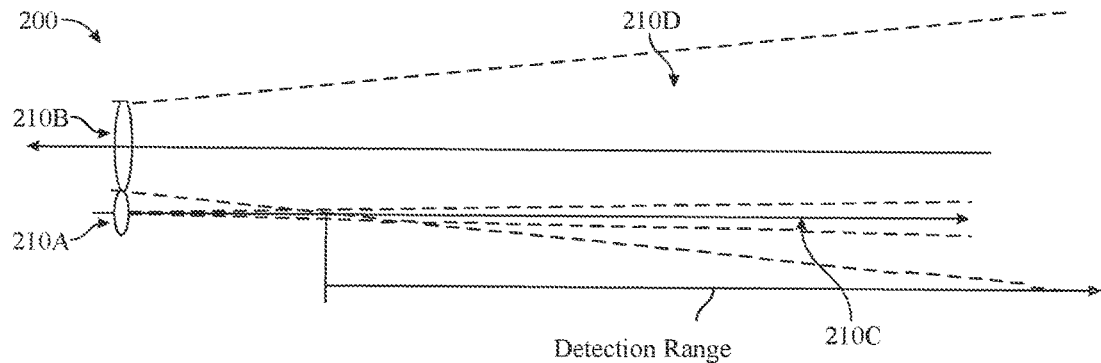
FIG. 2A illustrates a binocular LiDAR system.

FIG. 2A illustrates a binocular LiDAR system 200. In some examples, the binocular LiDAR system 200 transmits light pulses generated from a light source through a first aperture 210A along the illumination optical path 210C to objects within the field-of-view. The transmitted light pulses reach the objects and are scattered and dispersed in one or more directions. Some of the pulses of scattered light return along the detection optical path 210D through a second aperture 210B to a light detector. The geometry of the binocular LiDAR system 200 determines the detection range, which is determined by the overlapping region between the exemplary illumination optical path 210C and detection optical path 210D depicted in FIG. 2A. As such, pulses of scattered light in certain regions along the optical path of the binocular LiDAR system 200 may not return through the second aperture 210B. In some embodiments, illumination optical path 210C and detection optical path 210D are substantially parallel (e.g., with a small angle). As a result, the detection range can be wide. For example, as depicted in FIG. 2A, the detection range may not have boundary at the right side. The benefit of the binocular LiDAR system is that the illuminating optics and detection optics are physically separated within the LiDAR scanning system, so that it is easier to avoid light interference in the detection module by light scattering in the illuminating optics.

Figure 2B:
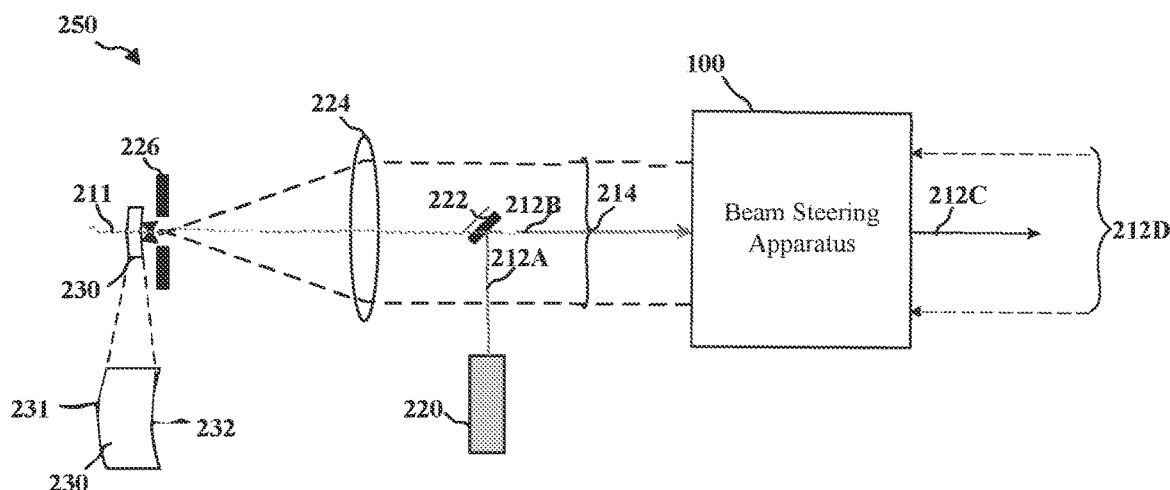
FIG. 2B illustrates a coaxial LiDAR system with a converging lens.

FIG. 2B illustrates a coaxial LiDAR scanning system 250 with a converging lens 224. In some embodiments, the coaxial LiDAR scanning system 250 includes a light source 220, a reflection mirror 222, a converging lens 224, a mask 226 with an aperture, a light detector 230, and a beam steering apparatus 100. As depicted in FIG. 2B, incident light pulses 212A generated from a light source 220 are directed to the reflection mirror 222, which redirects or reflects the incident light pulses 212A to generate redirected light pulses 212B. Redirected light pulses 212B are directed along the optical axis 211 to the beam steering apparatus 100. The beam steering apparatus 100 can then steer the redirected light pulses 212B similar to described above to generate steered light pulses 212C for illuminating objects in the FOV, where the direction of 212C in FIG. 2B only illustrates the point in time when the steered direction is parallel to the direction of 212B. In other points in time the direction of 212C can be in other directions in the FOV. In the example depicted in FIG. 2B, the reflection mirror 222 is a near 100% reflective mirror disposed at the optical axis 211, which is along the optical path of both the redirected light pulses 212B and the redirected returning light pulses 214. It should be appreciated that the reflection mirror 222 should be sufficiently small so as not to impede or interfere with the redirected returning light pulses 214.

In the example of FIG. 2B, the beam steering apparatus 100 can be the coaxial beam steering apparatus 100 from FIG. 1B. In some examples, the beam steering apparatus 100 can be a dual coaxial apparatus that implements two substantially parallel pulses of light directed at one or more objects in a field-of-view. The beam steering apparatus 100 can be configured to steer the redirected light pulses 212B in the vertical and horizontal directions to generated steered light pulses 212C, while collecting returning light pulses 212D along the substantially same optical path as the steered light pulses 212C. The beam steering apparatus 100 redirects returning light pulses 212D to generate redirected returning light pulses 214 in the reverse direction of 212B. As such, the optical path of the returning light pulses 212D to redirected returning light pulses 214 overlaps the illuminating optical path of the redirected light pulses 212B to steered light pulses 212C, therefore increase the effective detection range.

With reference to FIG. 2B, the converging lens 224 of the coaxial LiDAR scanning system 250 is configured to collect redirected returning light pulses 214 along the optical axis 211 and direct the redirected returning light pulses 214 through the aperture of the mask 226 to the light detector 230. The converging lens 224 can be made from any transparent material such as high index glass, plastic, or the like. As depicted in FIG. 2B, the converging lens 224 can be substantially concentric with the optical axis 211. It should be appreciated that, in some embodiments, the converging lens 224 is disposed such that it is non-concentric with the optical axis 210.

As depicted in FIG. 2B, in some examples, the light detector 230 is disposed substantially concentric with the optical axis 211. The light detector 230 can be a photodiode, an avalanche photodiode, or the like. In some embodiments, as illustrated in the enlarged diagram of light detector 230 depicted in FIG. 2B, the light detector 230 can include a reflective surface 231 (e.g., a reflective mirror) facing the opposite side of the light incident surface 232. The reflective surface 231 can redirect (e.g., reflect) light back to the absorption region of the light detector 230, thereby increasing the detection efficiency and sensitivity. In some embodiments, the mask 226 can be part of the light detector 230. In general, the mask 226 filters the redirected returning light pulses 214 near the light detector 230 that are obliquely angled with respect to the optical path (e.g., optical path along optical axis 211), so that only light pulses that are substantially parallel to the optical axis 211 can reach the light detector 230.

In the example depicted in FIG. 2B, the light source 220 can be a laser light source. In some examples, the laser light generated by light source 220 can have a wavelength in the visible spectrum. In some examples, the laser light can have a wavelength in the infrared spectrum. In some examples, the laser light can have a wavelength in the ultra violet spectrum.

Figure 2C:
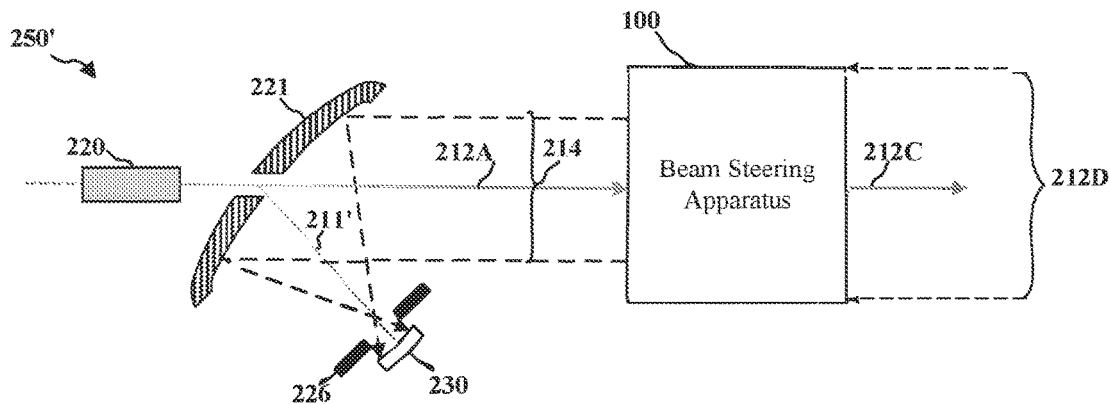
FIG. 2C illustrates a coaxial LiDAR system with a converging mirror.

FIG. 2C illustrates a coaxial LiDAR scanning system 250' with a converging mirror 221. In some embodiments, the coaxial LiDAR scanning system 250' includes a light source 220, a converging mirror 221, a mask 226 with an aperture, a light detector 230, and a beam steering apparatus 100. As depicted in FIG. 2C, incident light pulses 212A generated from a light source 220 are directed through an aperture of the converging mirror 221 along an optical axis 211 to beam steering apparatus 100. The beam steering apparatus 100 steers (e.g., redirects and reflects) the incident light pulses 212A to generate steered light pulses 212C to illuminate an object. The object may scatter the steered light pulses 212C. A portion of the pulses of the scattered light returns to the beam steering apparatus 100 as returning light pulses 212D. The returning light pulses 212D are directed along a path that is substantially similar or parallel to the path of the steered light pulses 212C. The beam steering apparatus 100 can then direct the returning light pulses 212D to generate redirected returning light pulses 214 which is at the direction coaxially with the optical axis 211 toward the converging mirror 221, which redirects (e.g., reflects) the redirected returning light pulses 214 toward the light detector 230 through the aperture of the mask 226.

In some embodiments, as described, the converging mirror 221 of the coaxial LiDAR scanning system 250 is configured to collect the redirected returning light pulses 214 along the optical axis 211 and redirect the redirected returning light pulses 214 through the aperture of the mask 226 to the light detector 230. In the example depicted in FIG. 2C, the converging mirror 221 can be a near 100% reflective mirror disposed at or near the optical axis 211, which is along the optical path of both the steered light pulses 212C and the redirected returning light pulses 214. The converging mirror 221 causes the redirected returning light pulses 214 to focus on the light detector 230. It should be appreciated that, in some embodiments, the converging mirror 221 can be disposed such that it is non-concentric with the optical axis 211. The converging mirror 221 can be made from any substrate (e.g., glass, plastic, metal, etc.) with a reflective mirror finish layer. In some examples, an anti-oxidation layer is applied to the reflective mirror finish layer so as to hermetically isolate the reflective layer from air. This prevents oxygen and other corrosive agents (e.g., corrosive gases or corrosive liquids) from tarnishing the reflective portions of the surface of the converging mirror 221.

In the example depicted in FIG. 2C, the beam steering apparatus 100 can be the coaxial beam steering apparatus 100 of FIG. 1B. In some embodiments, the beam steering apparatus 100 can be a dual coaxial apparatus that implements two substantially parallel pulses of light directed at one or more objects in a field-of-view. The beam steering apparatus 100 can be configured to direct the incident light pulses 212A in the vertical and horizontal directions to generate steered light pulses 212C, while collecting returning light pulses 212D along substantially the same optical path as the steered light pulses 212C. For example, as shown in FIG. 2C, the optical path of the returning light pulses 212D may be substantially parallel to at least part of the optical path of the steered light pulses 212C. As such, the optical path of the returning light pulses of 212D overlaps the optical path of the steered light pulses 212C.

As depicted in FIG. 2C, in some embodiments, the light detector 230 is disposed substantially concentric with the reflected optical axis 211'. In some embodiments, the reflected optical axis 211' extends from the converging mirror 221 (e.g., the center of aperture of converging mirror 221) through the focal point of the converging mirror 221. The reflected optical axis 211' may form an angle with the optical axis 211, which is substantially parallel to the optical path of the steered light pulses 212C and redirected returning light pulses 214. The light detector 230 can be a photodiode, an avalanche photodiode, or the like. In some embodiments, similar to that illustrated in FIG. 2B, the light detector 230 can include a reflective surface (e.g., a reflective mirror) facing the opposite side of the light incident surface. The reflective surface can redirect (e.g., reflects) light back to the absorption region of the light detector 230, thereby increasing the detection efficiency and sensitivity. In some embodiments, the mask 226 can be part of the light detector 230.

In the example depicted in FIG. 2C, the light source 220 can be a laser light source. In some examples, the laser light generated by light source 220 can have a wavelength in the visible spectrum. In some examples, the laser light can have a wavelength in the infrared spectrum. In some examples, the laser light can have a wavelength in the ultra violet spectrum.

Figure 3:
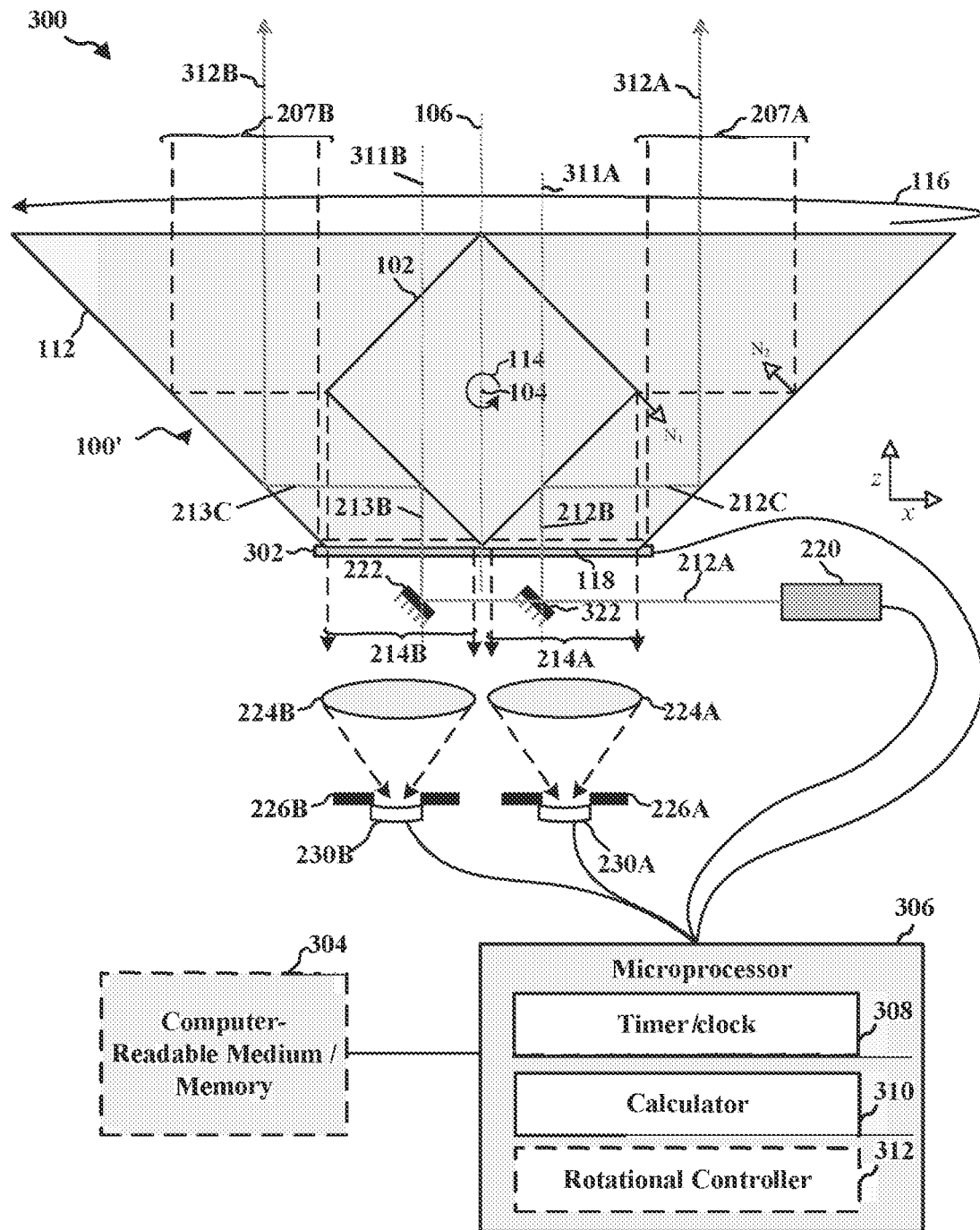
FIG. 3 illustrates a dual coaxial LiDAR system.

FIG. 3 illustrates a dual coaxial LiDAR scanning system 300. As depicted in FIG. 3, the dual coaxial LiDAR scanning system 300 can include a light source 220, a reflection mirror 222, a partial reflection mirror 322, a first converging lens 224A, a second converging lens 224B, a first mask 226A with an aperture, a second mask 226B with an aperture, a first light detector 230A, a second light detector 230B, and a dual beam steering apparatus 100'. As depicted in FIG. 3, incident light pulses 212A generated from a light source 220 are directed to the partial reflection mirror 322, which reflects a first portion of the incident light pulses 212A to generate redirected light pulses 212B. Based on the redirected light pulses 212B, polyhedron 102 generates redirected light pulses 212C, which in turn are redirected by concave reflector 112 to generate steered light pulses 312A. Steered light pulses 312A can be directed to the objects in the FOV through the aperture 118 of the beam steering apparatus 100'. In the example depicted in FIG. 3, the partial reflection mirror 322 is a 50% reflective mirror disposed along the first optical axis 311A. The partial reflection mirror 322 can be configured to reflect, for example, 50% of the incident light along the first optical axis 311A. In some embodiments, the partial reflection mirror 322 can be configured to reflect more than 50% of the incident light along the first optical axis 311A. In some embodiments, the partial reflection mirror 322 can be configured to reflect less than 50% of the incident light along the first optical axis 311A. It should be appreciated that the partial reflection mirror 322 should be sufficiently small so as not to block a significant portion of the first returning light pulses 207A.

As depicted in FIG. 3, another portion of incident light pulses 212A passes through the partial reflection mirror 322 and becomes a second portion of the incident light pulses 212A. The second portion of the incident light pulses 212A can be redirected to the reflection mirror 222, which redirects the second portion of the incident light pulses 212A to generate redirected light pulses 213B. Based on the redirected light pulses 213B, polyhedron 102 generates redirected light pulses 213C, which in turn are redirected by concave reflector 112 to generate steered light pulses 312B. Steered light pulses 312B can be directed along a second optical axis 311B through the aperture 118 of the beam steering apparatus 100. In the example depicted in FIG. 3, the reflection mirror 222 can be a near 100% reflective mirror disposed at the second optical axis 311B. It should be appreciated that the reflection mirror 222 should be sufficiently small so as not to block a significant portion of the returning light pulses 207B. It is also appreciated that while FIG. 3 illustrates that the two portions of the incident light pulses 212A are generated from light source 220, two separate and independent light sources can be used to generate the two portions of incident light pulses 212A separately.

The dual beam steering apparatus 100' illustrated in FIG. 3 can be the coaxial beam steering apparatus 100, depicted in FIG. 1B. A difference in this example is that the beam steering apparatus 100' is configured for directing two beams of light pulses (e.g., first steered light pulses 312A and second steered light pulses 312B) to illuminate one or more objects in a field-of-view. For example, the beam steering apparatus 100' can be configured to direct the first steered light pulses 312A and the second steered light pulses 312B in the vertical and horizontal directions, while collecting the first returning light pulses 207A and the second returning light pulses 207B. The first returning light pulses 207A and the second returning light pulses 207B can have optical paths that are substantially the same or parallel to the optical paths of the first steered light pulses 312A and the second steered light pulses 312B, respectively. As such, the optical paths of the first returning light pulses 207A and the second returning light pulses 207B overlap the optical paths of the first steered light pulses 312A and the second steered light pulses 312B, respectively. In some embodiments, dual coaxial LiDAR scanning system 300 can also include a power controller (not shown) configured to dynamically control the power of the light source 220. The controlling of the power of light source 220 can be based on a cross section area of an aperture associated with the returning light pulses 207A-B. The controlling of the power of light source 220 can compensate the aperture variation within the field-of-view.

In the example depicted in FIG. 3, the dual beam steering apparatus 100' can be generally asymmetrical on the x-z plane. As such, the optical components geometry for generating the first steered light pulses 312A can be asymmetrical to that for generating the second steered light pulses 312B at any point of time. Similarly, the optical components geometry for directing the first returning light pulses 207A can be asymmetrical to that for directing the second returning light pulses 207B at any point of time. As a result, the optical path of the first steered light pulses 312A can scan at a different range and pattern than the second steered light pulses 312B.

With reference to FIG. 3, similar to those described above, the first returning light pulses 207A and the second returning light pulses 207B can be directed by the dual beam steering apparatus 100' toward first converging lens 224A and second converging lens 224B through aperture 118. Similar to those described above, the first and second returning light pulses 207A and 207B and be redirected by the polyhedron 102 and concave reflector 112 to generate first and second redirected returning light pulses 214A and 214B, respectively. In some embodiments, the first converging lens 224A of the coaxial LiDAR scanning system 300 is configured to collect the first redirected returning light pulses 214A along the first optical axis 311A and direct the first redirected returning light pulses 214A through the aperture of the first mask 226A to the first light detector 230A. Likewise, the second converging lens 224B of the coaxial LiDAR scanning system 300 is configured to collect the second redirected returning light pulses 214B along the second optical axis 311B and direct the second redirected returning light pulses 214B through the aperture of the second mask 226B to the second light detector 230B. Both the first converging lens 224A and second converging lens 224B can be made from any transparent material such as high index glass, plastic, or the like. In the example depicted in FIG. 3, the first converging lens 224A is non-concentric with the first optical axis 311A and the second converging lens 224B is non-concentric with the second optical axis 311B. It should be appreciated that, in some embodiments, one or both of the first converging lens 224A and the second converging lens 224B can be concentric with the first optical axis 311A and the second optical axis 311B, respectively.

As depicted in FIG. 3, in some examples, the first light detector 230A can be disposed at or near the focal region of the first converging lens 224A. Likewise, the second light detector 230B can be disposed at or near the focal region of the second converging lens 224B. As a result, the first redirected returning light pulses 214A can be focused on the first light detector 230A and the second redirected returning light pulses 214B can be focused on the second light detector 230B. One or both of the first light detector 230A or the second light detector 230B can be a photodiode, an avalanche photodiode, or the like. In some embodiments, similar to the light detector 230 described above, one or both of the first light detector 230A or the second light detector 230B can include a reflective surface (e.g., a reflective mirror) facing the opposite side of the light incident surface. The light incident surface can redirect (e.g., reflect) light back to the absorption region of the first light detector 230A or the second light detector 230B, respectively. As a result, the efficiencies and sensitivity of the first and second light detectors 230A and 230B can be improved. In some embodiments, the first mask 226A can be part of the first light detector 230A. In some embodiments, the second mask 226B can be part of the second light detector 230B.

In the example depicted in FIG. 3, the light source 220 can be a laser light source. In some examples, the laser light generated by light source 220 can have a wavelength in the visible spectrum. In some examples, the laser light can have a wavelength in the infrared spectrum. In some examples, the laser light can have a wavelength in the ultra violet spectrum.

As illustrated in FIG. 3, in some examples, the dual coaxial LiDAR scanning system 300 includes a microprocessor 306 that is electrically coupled to a computer-readable medium/memory 304, the light source 220, the first light detector 230A, the second light detector 230B, and one or more motors 302. The microprocessor in the dual coaxial LiDAR scanning system 300 can execute software. Software can include, for example, instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In some embodiments, the microprocessor 306 can be configured to determine a distance to one or more objects in the field-of-view. As depicted in FIG. 3, the microprocessor 306 includes a timer/clock module 308 and calculator 310, which are configured to calculate the distance to one or more objects based on a time difference between transmitting the steered light pulses 312A and detecting the first returning light pulses 207A for each corresponding pulse of light.

The timer/clock module 308 is configured to mark each light pulse that is transmitted or received with a timestamp. The timestamp is an encoded date and time. Examples of time timestamps include "month-day-year@hour:min:sec," "month-day-year@hour:min:sec," "year-dd-month@hour:min:sec," "1234567890 (Unix time)," etc. In some embodiments, the transmitting of the steered light pulse triggers the timer/clock module 308 to mark a steered light pulse with a timestamp. The timer/clock module 308 can further pair a steered light pulse with a corresponding returning light pulse and determine the time difference based on the timestamps.

The calculator 310 is configured to calculate the distance to one or more objects from the time difference. In some examples, the calculator 310 can multiply the time difference by the speed of light divided by 2 (assuming a symmetric optical path) to determine the distance to an object. For example, if a time difference is 0.8 microseconds, the calculator 310 calculates the distance to an object to be about 120 meters away (e.g., $(0.8*10^{-6})*(2.9979*10^8)/2$). After calculating the distance, the calculator 310 can store the values to computer-readable medium/memory 304.

The computer-readable medium/memory 304 is electrically coupled to microprocessor 306 and can provide storage for identifiers associated with steered light pulses transmitted to the FOV, identifiers associated with returning light pulses, timestamps, distance determinations, etc. In some example, each pulse (e.g., a steered light pulse transmitted to the FOV and/or a returning light pulse) can be assigned an identifier that uniquely identifies the particular pulse). Identification of the pulses enables the determination of the time differences between the corresponding transmitted and returning light pulses.

In some embodiments, the microprocessor 306 can optionally include a rotational controller 312. The rotational controller 312 is configured to control the first rotational velocity of the concave reflector 112 and the second rotational velocity of the polyhedron 102. The rotational controller 312 is electrically coupled to one or more motors 302, which are operatively coupled to the concave reflector 112 and the polyhedron 102. In some examples, rotational controller 312 can vary the first rotational velocity of the concave reflector 112 and the second rotational velocity of the polyhedron 102 by changing the driving current to the one or more motors 302.

In some embodiments, the rotational controller 312 is configured to superimpose a random perturbation to a control parameter to cause in the first rotational velocity of the concave reflector 112 and/or the second rotational velocity of the polyhedron 102 to increase proportionally with the random perturbation. The random perturbation of the first rotational velocity of the concave reflector 112 and/or the second rotational velocity of the polyhedron 102 causes the horizontal and vertical scanning angles associated with the light pulses transmitted from the beam steering apparatus 100' to distribute randomly when the light pulses are substantially periodic (e.g., equal intervals). This facilitates a more random coverage in a sub-frame. In some examples, the rotation controller 312 can set the first rotational velocity of the concave reflector 112 to 10 rps and set the second rotational velocity of the polyhedron 102 to 500 rps. The rotational controller 312 can additionally add a perturbation of ±1 rps to one or both of first rotational velocity of the concave reflector 112 and the second rotational velocity of the polyhedron 102. In some instances, the perturbation can be the same and in others the perturbation can be different.

The one or more motors are operatively coupled to the concave reflector 112 and the polyhedron 102. In some examples, a first motor can rotate the concave reflector 112 while a second motor can rotate the polyhedron 102. In some examples, a single motor coupled to one or more gears can rotate the concave reflector 112 and rotate the polyhedron 102. In the example depicted in FIG. 3, the one or more motors 302 can be configured to rotate the concave reflector 112 around the first axis 106 at a first rotational velocity and rotate the polyhedron 102 around the second axis 104 at a second rotational velocity. In some embodiments, the first and second rotational velocities are controlled to be independent from each other.

Figure 4A:
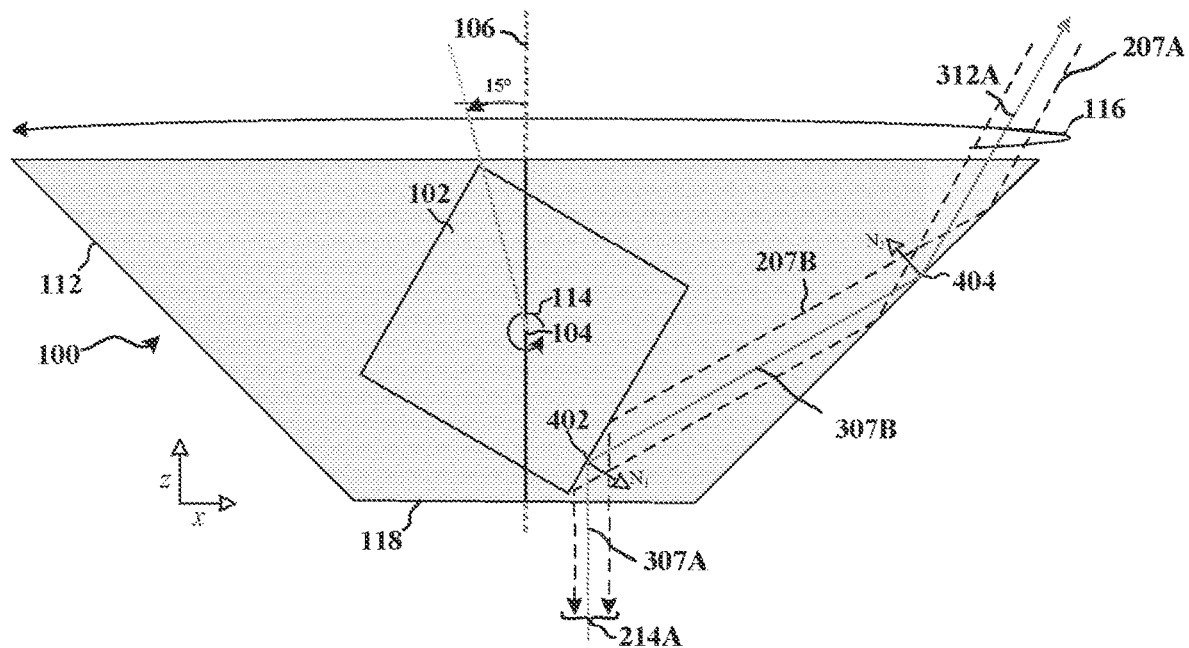
FIG. 4A illustrates an exemplary beam steering apparatus that directs transmitted light to and collects scattered light from a direction between the positive x-axis and positive z-axis.

FIG. 3 illustrate that the first steered light pulses 312A and the second steered light pulses 312B are directed along the direction of positive z-axis. The positions of the polyhedron 102 and the concave reflector 112, as depicted in FIG. 3, for generating first steered light pulses 312A and the second steered light pulses 312B that are directed along the direction of positive z-axis can be defined as the nominal position. The beam steering apparatus 100 can direct the steered light pulses to, and collect the returning light pulses from, any desired direction in the field-of-view when the polyhedron 102 and concave reflector 112 rotate at certain angles. FIG. 4A illustrates an exemplary beam steering apparatus 100 that directs steered light pulses to, and collects returning light pulses from, a direction between the positive x-axis and positive z-axis. In some examples, as depicted in FIG. 4A, the instantaneous position of the rotating polyhedron 102 is at +15° with respect to the nominal position and the instantaneous position of the rotating concave reflector 112 is at the nominal position. As depicted in FIG. 4A, the light pulses 307A is directed through the aperture 118 of the beam steering apparatus 100 and redirected by (e.g., reflected off) the polyhedron 102 to generate redirected light pulses 307B. The redirection can occur at or near point 402 and can steer the redirected light pulses 307B towards the concave reflector 112. The redirected light pulses 307B is further redirected by (e.g., reflected off) a reflective surface (e.g., mirror) of the concave reflector 112 to generate the first steered light pulses 312A. The redirection can occur at or near point 404 and can direct the first steered light pulses 312A towards one or more objects in the direction between the positive x-axis and the positive z-axis in the field-of-view. The first steered light pulses 312A illuminates the objects and the first returning light pulses 207A returns along an optical path substantially coaxial or parallel with the first steered light pulses 312A. In the example depicted in FIG. 4A, the first returning light pulses 207A overlaps with the first steered light pulses 312A. For example, the first steered light pulses 312A illuminates an object at about a 30° angle toward the horizontal direction (e.g., 30° angle between the positive z-axis and the direction of the transmitted light pulses 312A) and the exemplary beam steering apparatus 100 collects first returning light pulses 207A at about a 30° angle toward the horizontal direction. Similar to those described above, first returning light pulses 207A can be redirected by polyhedron 102 and concave reflector 112 to generate redirected returning light pulses 214A.

Figure 4B:
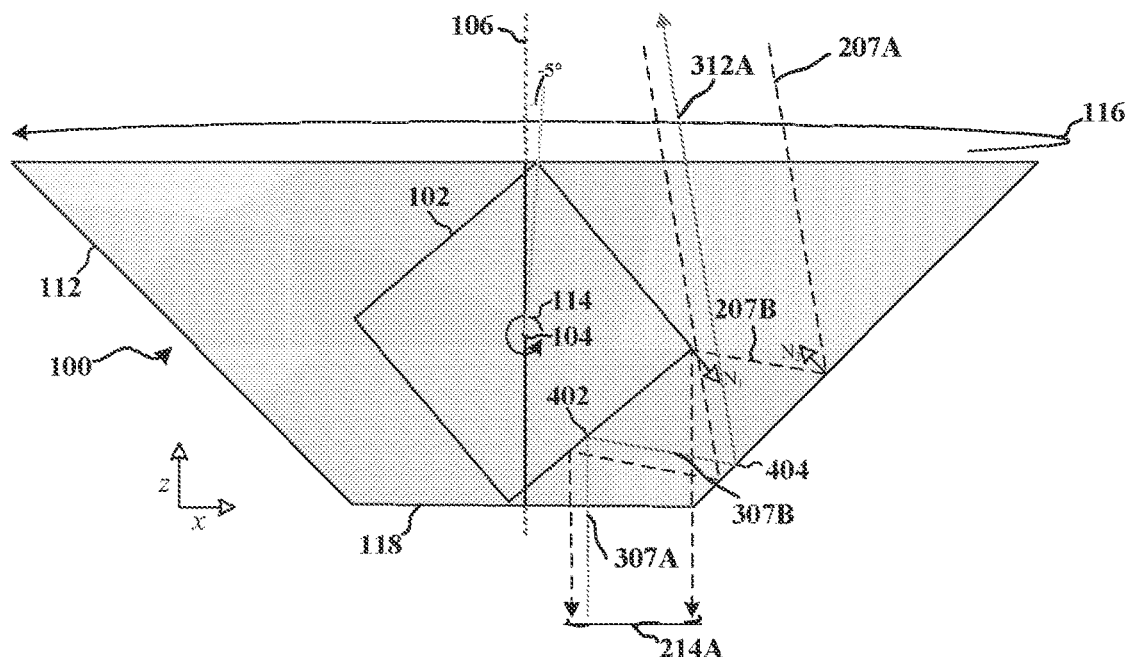
FIG. 4B illustrates an exemplary beam steering apparatus that directs transmitted light to and collects scattered light from a direction between the negative x-axis and positive z-axis.

FIG. 4B illustrates an exemplary beam steering apparatus 100 that directs steered light pulses to the FOV to and collects returning light pulses from a direction between the negative x-axis and positive z-axis. In some examples, as depicted in FIG. 4B, the instantaneous position of the rotating polyhedron 102 is at −5° (or 355°) with respect to the nominal position and the instantaneous position of the rotating concave reflector 112 is at the nominal position. As depicted in FIG. 4B, the light pulses 307A are directed through the aperture 118 of beam steering apparatus 100 and redirected by (e.g., reflected off) the polyhedron 102 to generate redirected light pulses 307B. The redirection can occur at or near point 402 and can steer redirected light pulses 307B towards the concave reflector 112. The redirected light pulses 307B are further redirected by (e.g., reflected off) a reflective surface (e.g., mirror) of the concave reflector 112 to generate first steered light pulse 312A. The redirection can occur at or near point 404 and can direct the first steered light pulses 312A towards one or more objects in the direction between the negative x-axis and the positive z-axis in the field-of-view. The first steered light pulses 312A illuminates the objects and the first returning light pulses 207A returns along an optical path substantially coaxial or parallel with first steered light pulses 312A. In the example depicted in FIG. 4B, the first returning light pulses 207A overlaps with the first steered light pulses 312A, where the first steered light pulses 312A illuminates an object at about a −10° angle toward the horizontal direction (e.g., −10° angle between the positive z-axis and the direction of the first steered light pulses 312A) and the exemplary beam steering apparatus 100 collects first returning light pulses 207A at about a −10° angle toward the horizontal direction. Similar to those described above, first returning light pulses 207A can be redirected by polyhedron 102 and concave reflector 112 to generate redirected returning light pulses 214A.

Figure 5:
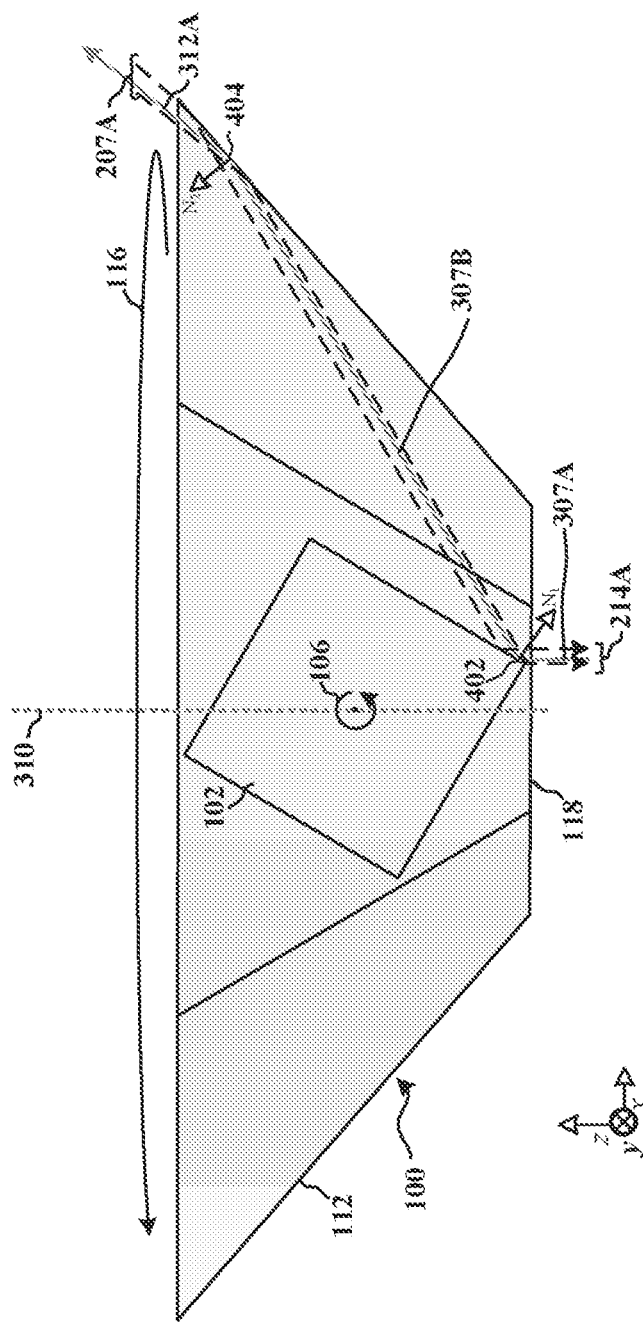
FIG. 5 illustrates an exemplary beam steering apparatus that directs transmitted light to, and collects scattered light from, a direction that is more toward the edge of the positive horizontal range of the field-of-view.

In some embodiments, beam steering apparatus 100 can be configured to transmit light pulses to and collect returning light pulses from a direction more toward the edge of a field-of-view. FIG. 5 illustrates an exemplary beam steering apparatus 100 that directs steered light pulses to, and collects returning light from, a direction that is more toward the edge of the positive horizontal range of the field-of-view. As illustrated in FIG. 5, the instantaneous position of the rotating polyhedron 102 is at 15° with respect to the nominal position and the instantaneous position of the rotating concave reflector 112 is at 300 with respect to the nominal position. As depicted in FIG. 5, the light pulses 307A are directed through the aperture 118 of beam steering apparatus 100 and redirected by (e.g., reflected off) the polyhedron 102 to generate redirected light pulses 307B at or near point 402. The redirection can steer the redirected light pulses 307B towards the concave reflector 112. The redirected light pulses 307B are further redirected by (e.g., reflected off) a reflective surface (e.g., mirror) of the concave reflector 112 to generate first steered light pulses 312A at or near point 404. The redirection can direct the steered light pulses 312A towards one or more objects in a direction that is more toward the edge of the field-of-view. The first steered light pulses 312A illuminate the objects and the first returning light pulses 207A return along an optical path substantially coaxial or parallel with first steered light pulses 312A. In the example depicted in FIG. 5, the first returning light pulses 207A overlap with the first steered light pulses 312A. For example, the first steered light pulses 312A illuminate an object at about a 40° angle toward (e.g., 40° angle between the positive z-axis and the projection of the steered light pulses 312A on the X-Z plane) the positive x-direction and about −7° toward the y-direction (e.g., at 7° at the negative y direction between the z-axis and the projection of the steered light pulses 312A on the Y-Z plane), and the exemplary beam steering apparatus 100 collects first returning light pulses 207A at about a 40° angle toward the positive x-direction and about −7° toward the y-direction. Similar to those described above, first returning light pulses 207A can be redirected by polyhedron 102 and concave reflector 112 to generate redirected returning light pulses 214A.

In some embodiments, to further extend the scanning range, concave lenses or cylindrical lenses can be disposed in the optical path of the steered light pulses 312A and/or the second steered light pulses 312B as they are being transmitted from the beam steering apparatus 100. This configuration can further extend the horizontal and/or vertical scanning range. In some examples, including convex lenses may also expand the light angle, which may decrease the resolution.

Figure 6A:
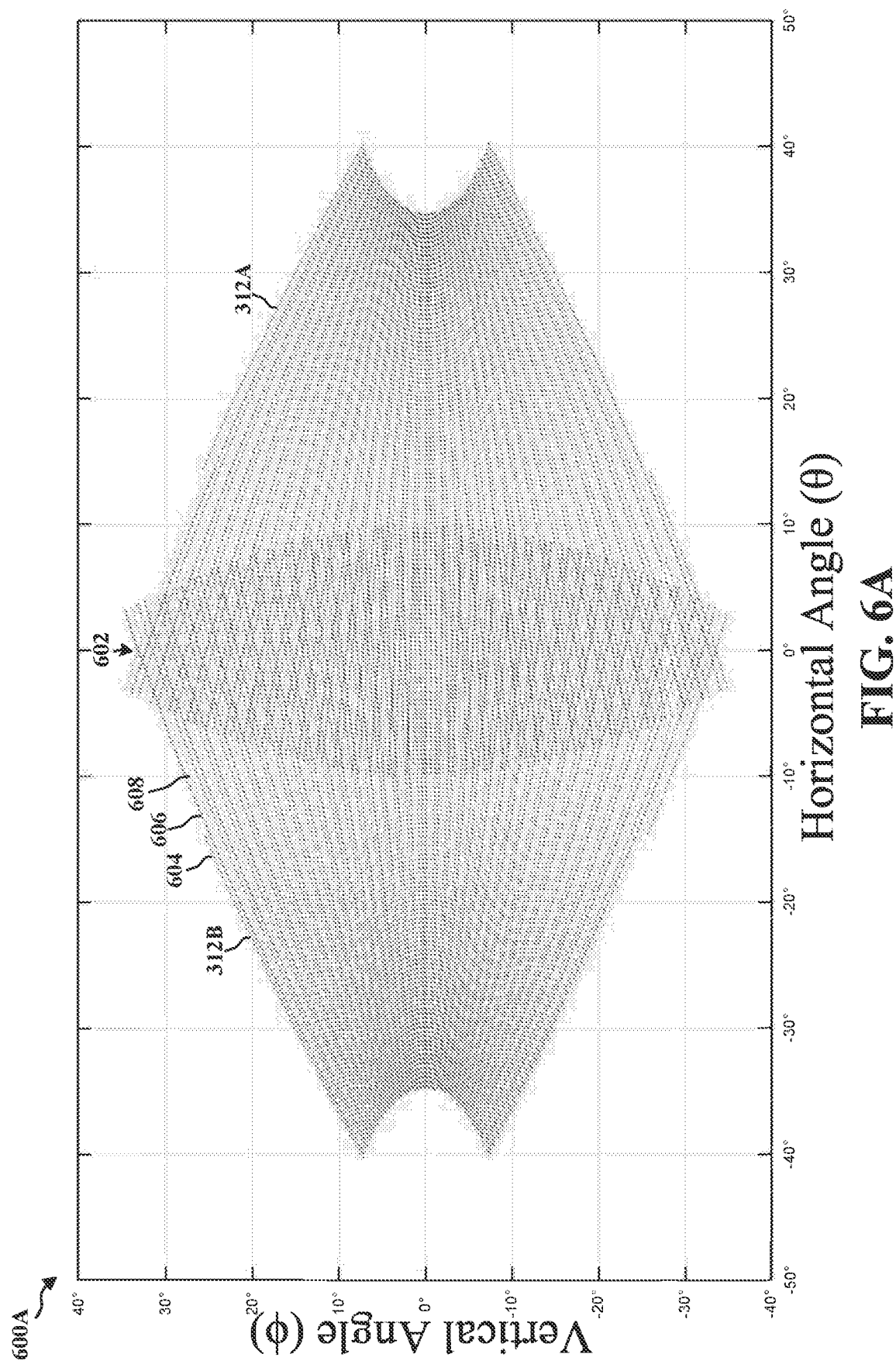
FIGS. 6A and 6B illustrate interlaced frame diagrams for angle distribution across the horizontal and vertical direction for a dual coaxial LiDAR system.
Figure 6B:
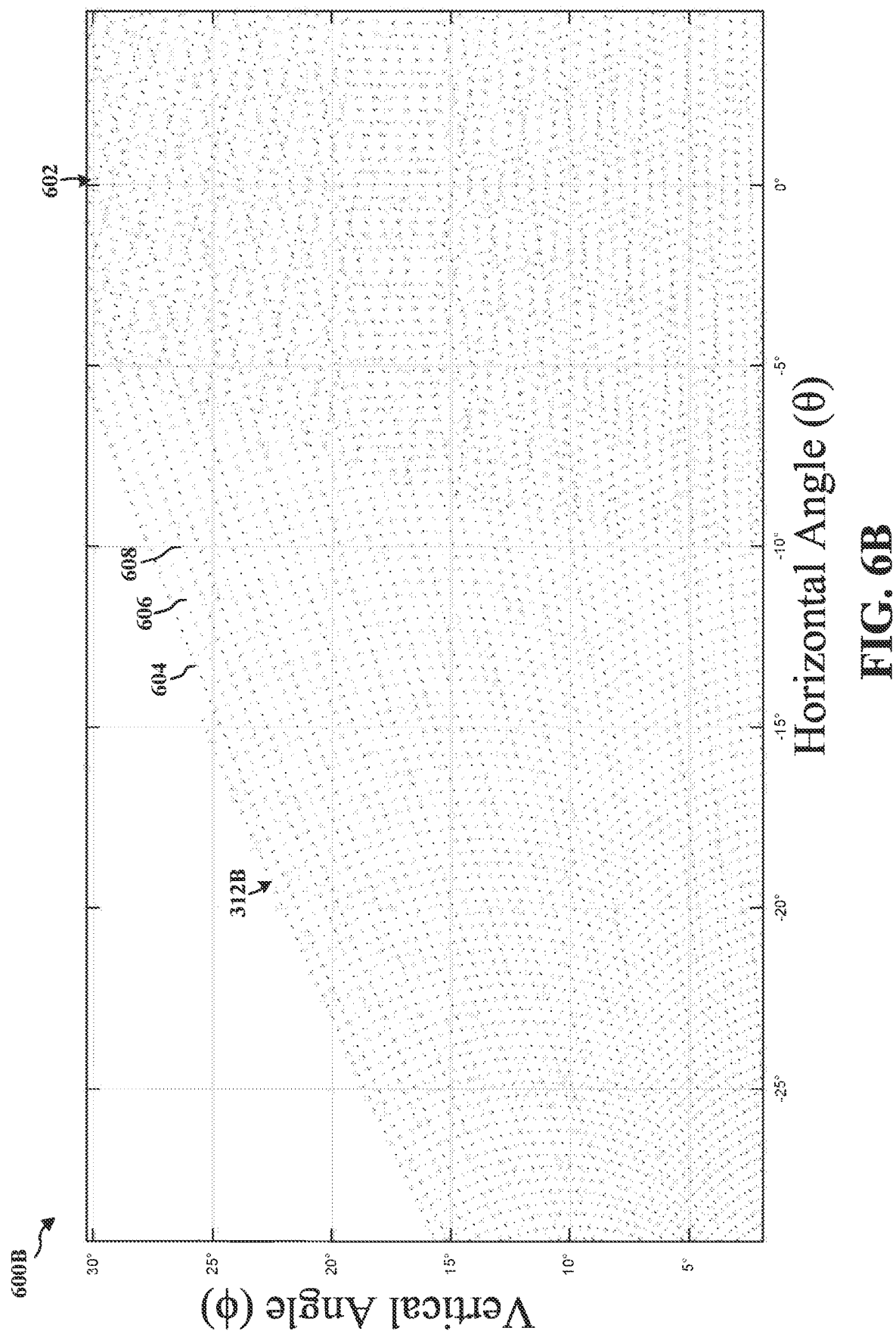

FIGS. 6A and 6B illustrate interlaced frame diagrams for angle distribution across the horizontal and vertical directions for a dual coaxial LiDAR scanning system 300 (FIG. 3). The diagrams 600A-B of FIGS. 6A-6B illustrate results of a simulation in which the dual coaxial LiDAR scanning system 300 is configured to collect data in about 50 milliseconds. The diagrams show a combination of three consecutive sub-frames that form one frame, which corresponds to about 20 frames per second (fps). To form the first sub-frame 604, the dual coaxial LiDAR scanning system 300 consecutively samples one or more objects at periodic intervals across the field-of-view in both the horizontal and vertical directions. In doing so, the laser light beam (the light beam spot at or near point 404 as shown in FIGS. 4A-4B and 5) redirected by (e.g., reflecting off) the reflective surface (e.g., a mirror) of the concave reflector 112 (as shown in FIG. 4A, 4B, or 5) moves across the mirror at one of the facets of the polyhedron 102, such that the light beam spot moves from one edge of the mirror to other edge of the mirror. To form the second sub-frame 606, the dual coaxial LiDAR scanning system 300 consecutively samples one or more objects at periodic intervals across the field-of-view except this time the scanning in the horizontal and vertical directions are slightly offset from the scanning for generating the first sub-frame 604. With this scanning offset, the light beam moves across the mirror at one of the facets of the polyhedron 102, such that the light beam spot moves from one edge of the mirror to other edge of the mirror. To form the third sub-frame 608, the dual coaxial LiDAR scanning system 300 consecutively samples one or more objects at periodic intervals over field-of-view except this time the scanning in the horizontal and vertical directions are slightly offset from the scanning for generating the first sub-frame 604 and scanning for generating the second sub-frame 606. The first sub-frame 604, second sub-frame 606, and the third sub-frame 608 are interlaced to form a single frame with a higher density of samples, which corresponds to a higher resolution. The single frame also represents motion correction of both the LiDAR scanning system's movement and the detected object's movement.

As depicted in FIG. 6A, rasterized points from the frame generated by the steered light pulses 312A form a pattern that covers a range of approximately −10° and 40° in the x direction and −30° and 30° in the y direction. Similarly rasterized points of the frame generated by the steered light pulses 312B form a pattern that covers a range of approximately −40° and 10° in the x direction and −30° and 30° in the y direction. Within the range for dual coaxial LiDAR scanning system 300, there is some overlap region 602 between the first steered light pulses 312A and the second steered light pulses 312B. The overlapping provides for a denser data sampling at the center of field-of-view (e.g., roughly between −10° and 10° in the x direction and −30° and 30° in the y direction). As such the resolution is higher in the overlapping region 602.

The shape of the rasterized frame pattern depicted in FIGS. 6A and 6B is based on the geometry of the dual beam steering apparatus 100' (e.g., the geometry of polyhedron 102 and the concave reflector 112). Factors that obstruct the optical path can contribute to the overall rasterized frame pattern as depicted in FIGS. 6A and 6B. For example, with reference to FIGS. 4A-4B, 5, and 6A-6B, in some instances the first steered light pulses 312A may miss the concave reflector 112 at certain angle, which determines an end of the scanning range of the dual beam steering apparatus 100'. These may correspond to the horizontal peripheral range. Overall, in some embodiments, the scanning range that the dual beam steering apparatus 100' can direct the first steered light pulses 312A between approximately −10° and 40° in the x direction and approximately −30° and 30° in the y direction. Similarly, the scanning range of the dual beam steering apparatus 100' can direct the second steered light pulses 312B between approximately −40° and 10° in the x direction and −30° and 30° in the y direction.

FIG. 6B illustrates an enlarged portion of a frame diagram for angle distribution across the horizontal and vertical directions for a dual coaxial LiDAR scanning system 300. FIG. 6B thus illustrates more clearly of the combination of three consecutive sub-frames (e.g., first sub-frame 604, second sub-frame 606, and third sub-frame 608). As described above, if perturbations are added to the rotational velocity of the polyhedron 102 and/or of the concave reflector 112, the angle distribution across the horizontal and vertical directions can be random.

In some examples, the sub-frames and/or frames depicted in FIGS. 6A and 6B can be mapped into three dimensions to form a "point cloud." For example, FIGS. 6A and 6B depict the locations in two dimensions for the light scattering on an object. In some examples, the calculator 310 of the microprocessor 306 (shown in FIG. 3) can provide the third dimension (e.g., a distance at corresponding horizontal and vertical angles). As such, the shape of the objects surrounding the LiDAR scanning system 300 can be reconstructed (e.g., by analyzing the "point cloud" using data analysis algorithms).

In some examples, objects positioned within the field-of-view may be moving or shifting during a scan for forming a frame or a sub-frame. For example, in some instances, the time span of the light pulses within one frame may be substantially short (e.g., less than 1 millisecond), which means that the objects, including both the dual coaxial LiDAR scanning system 300A and objects in the field-of-view, do not substantially move. In such instances, the sample points in the point cloud in the frame are collected at substantially the same time. In some instances, however, the time span may be relatively long (e.g., 20 to 50 milliseconds), which is sufficient time for one or more objects to move a measurable distance. For example, an object moving at about 65 miles per hour can move about 2 feet in 20 milliseconds. As such, the position of each point in the point cloud of the frame can be compensated by the LiDAR's own movement and the detected speed of the moving object in the field-of-view.

To accommodate for such movement of objects, the dual coaxial LiDAR scanning system 300 can determine the sampling rate from the one or more sub-frames, determine a relative velocity of the one or more objects, and compensate for the sampling rate and the relative velocity when forming a point cloud of points in three dimensions based on compensating for the aggregated distance. It should be appreciated that the data collected over any arbitrary time interval can be aggregated to form one frame of the point cloud. As such, the density of the point cloud can be more dense or less dense than the described above.

Figure 7:
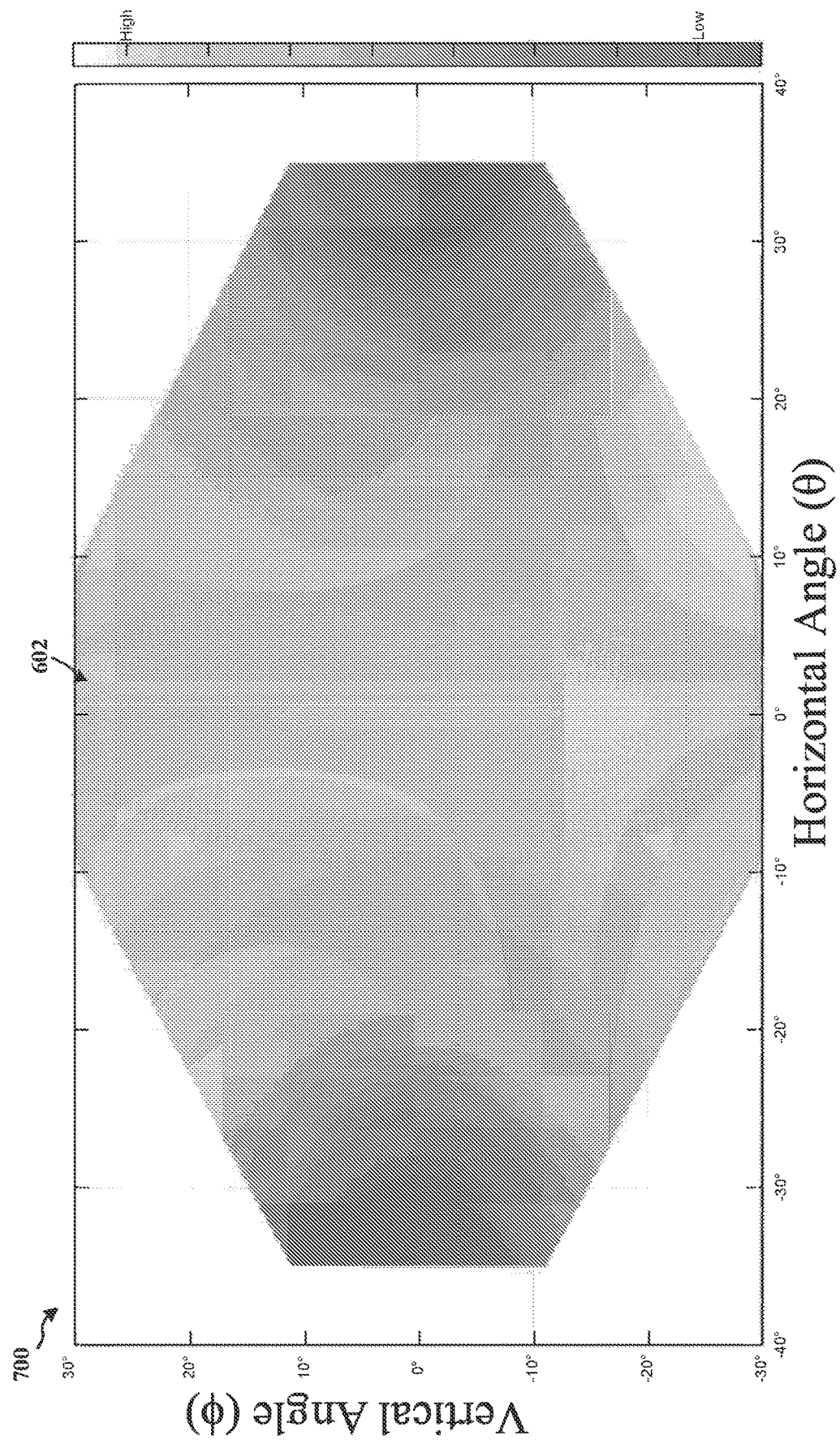
FIG. 7 illustrates a heat map corresponding to widths of the collection aperture along the x-z plane at y=0 across the horizontal and vertical directions for a dual coaxial LiDAR system.

FIG. 7 illustrates a heat map 700 corresponding to the collection aperture areas for a dual coaxial LiDAR system with certain system parameter values, where the collected cross-section areas of the first redirected returning light pulses 214A and the second redirected returning light pulses 214B depicted in FIGS. 1, 3, 4A, 4B, and 5 are both shown in FIG. 7 and overlap in the middle of the FOV. As such, the area of the collection aperture changes with the angle of the polyhedron 102 and the angle of the concave reflector 112. For example, the cross-section area of the first redirected returning light pulses of 214A depicted in FIG. 4A is smaller than the cross-section area of the first redirected returning light pulses of 214A depicted in FIG. 4B. As such, the intensity of the collected light corresponding to configuration of the polyhedron 102 and concave reflector 112 with angles depicted in FIG. 4A is less than that depicted in FIG. 4B for the same intensity of the first steered light pulses 312A and the same reflectance and distance from the object in the field of view.

In the example depicted in FIG. 7, the center region of the heat map 700 corresponding to about −10°~10° in the x direction and −30°~30° in the y direction has a high collection aperture. This region forms an hourglass shape from the dual optical paths that overlap in about the same region. The regions corresponding between about −35° and −30° in the x direction and between about −5° and 5° in the y direction as well as between about 30° and 35° in the x direction and between about −5° and 5° in the y direction have a low collection aperture, which is from oblique angles at the concave reflector 112.

In some embodiments, the power of the incident light pulses 212 from a light source 220 (shown in FIGS. 2B, 2C, and 3) can be varied based on the collection aperture. Varying the power of the incident light pulses 212 can compensate for the variation of collection aperture sizes of the first redirected returning light pulses 214A and the second redirected returning light pulses 214B across the vertical and horizontal directions in the field-of-view.

Figure 8:
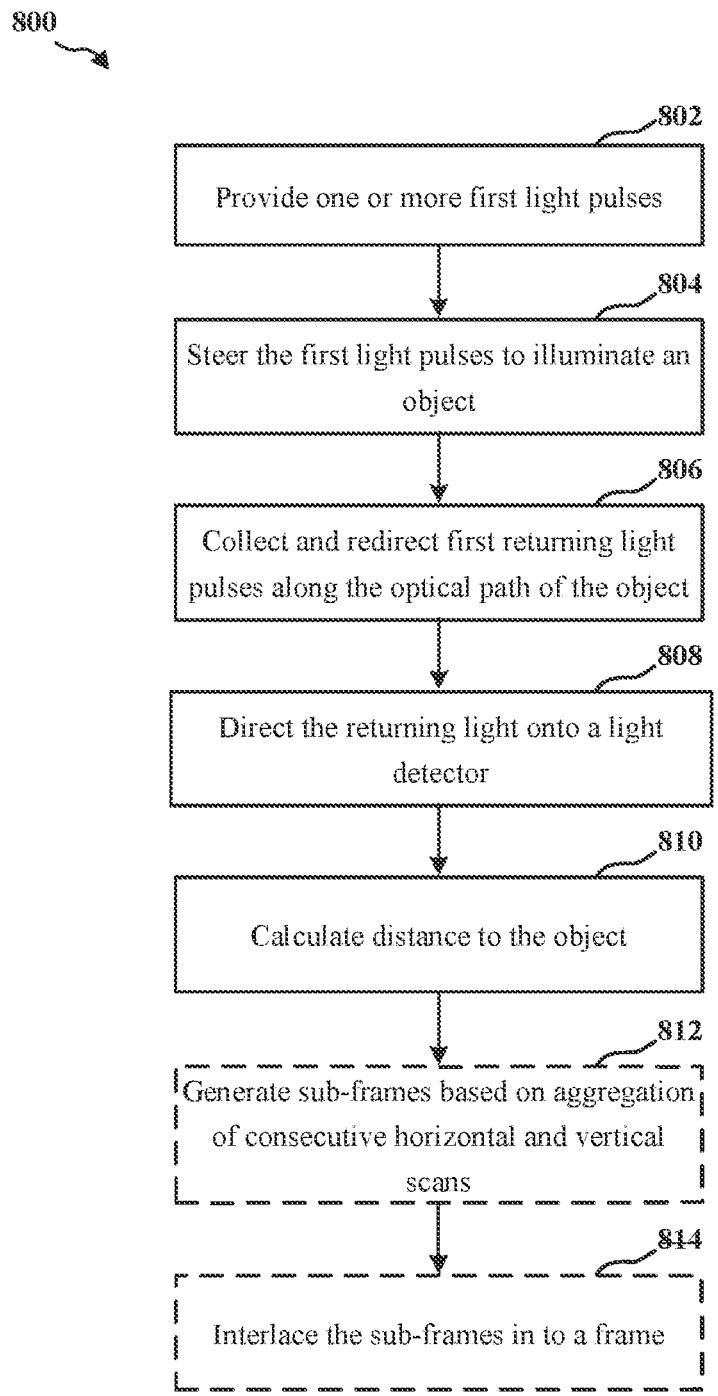
FIG. 8 illustrates an exemplary process for LiDAR scanning detection.

FIG. 8 illustrates an exemplary process 800 for LiDAR scanning detection according to examples of the disclosure. Process 800 can be performed by a system disposed or included in a vehicle, such as various systems depicted in FIGS. 1A-1B, 2A-2C, 3, 4A-4B, and 5, and systems depicted in 9A-9D, 10A-10B, and 11, as described in detail below. As shown in FIG. 8, at block 802, a first light source of a LiDAR scanning system can provide one or more first light pulses. In the examples described herein, the first light source can be a laser light source. It should be appreciated that the first light source can be incandescent light, fluorescent light, and the like. Further, the first light source can have one or more wavelengths that in the visible spectrum, one or more wavelengths in the infrared spectrum, or one or more wavelengths in the ultra violet spectrum.

At block 804, a beam steering apparatus of the LiDAR scanning system can steer the first light pulses to illuminate an object along an optical path. The beam steering apparatus can be the coaxial beam steering apparatus 100 that is configured to transmit a single beam of light pulses (e.g., light pulses 312A as depicted in FIG. 1B), or the dual coaxial beam steering apparatus 100' that is configured to transmit dual beams of light pulses (e.g., light pulses 312A and 312B as the depicted in FIG. 3). During consecutive scans, the rotation of a light beam steering device (e.g., the polyhedron 102) and a concave reflector (e.g., the concave reflector 112) can cause the reflective facets of the light beam steering device and the concave reflector that are in the optical path of the light pulses to change over time. The steering angle of the light pulses by the beam steering apparatus can be calculated with the rotational positions of the light beam steering device and the concave reflector. It should be appreciated that for some embodiments, the rotational positions of the light beam steering device and the concave reflector can trigger the light source to transmit a light pulse.

At block 806, in some examples, the beam steering apparatus (e.g., beam steering apparatus 100 or the dual beam steering apparatus 100') can collect and redirect returning light pulses (e.g., the first returning light pulses 207A generated based on the first steered light pulses 312A that illuminated the object). The collected returning light pulses can be aligned coaxially or in parallel with the optical path. The returning light pulses can be redirected by the concave reflector and the light beam steering device toward receiving optical systems. When using the beam steering apparatus, in some examples, the steered light pulses and the returning light pulses can be coaxially aligned. Moreover, the beam steering apparatus can transmits the steered light pulses while collecting the returning light pulses in parallel or substantially simultaneously. For example, the time a transmitted steered light pulse travels to illuminate an object and return along the same optical path is more or less instantaneous with respect to the positions of the light beam steering device (e.g., polyhedron 102) and the concave reflector. For example, time of flight of a light pulse is about 1 microsecond for an object that is about 150 meters away. This corresponds to about 0.18° rotation of the light beam steering device (e.g., polyhedron 102 spinning at 500 rps).

At block 808, a receiving optical system including a light converging apparatus can further direct (e.g., converge or focus) the redirected returning light pulses onto a light detector (e.g., first light detector 230A depicted in FIG. 3). In some examples, the light converging apparatus can be a converging lens 224 (FIG. 2B) or a converging mirror 221 (FIG. 2C).

At block 810, a microcontroller/processor can calculate (e.g., determine) a distance from the LiDAR scanning system to the object based on a time difference between transmitting the steered light pulses and detecting the corresponding returning light pulses. The time of flight for a light pulse to travel along the optical path is proportional to the distance that the light pulse travels to illuminate an object. In general, this time of flight for a light pulse to illuminate the object is about half the time it takes the light pulse to be detected.

At optional block 812, the microcontroller can generate one or more sub-frames based on aggregation of the distances to one or more objects across successive or consecutive horizontal and vertical scans (e.g., first sub-frame 604, second sub-frame 606, third sub-frame 608, FIGS. 6A and 6B). For example, a coaxial LiDAR scanning system or the dual coaxial LiDAR system (e.g., system 300) can consecutively sample the same one or more objects at periodic intervals over a field-of-view in both the horizontal and vertical directions. The field-of-view that is sampled (e.g., scanned) can be aggregated according to a first sub-pattern similar to the first sub-frame 604, annotated in FIGS. 6A and 6B. The dual coaxial LiDAR system can again consecutively sample one or more at periodic intervals over the same field-of-view except this time the horizontal and vertical directions are slightly offset from the first sub-frame 604. The field-of-view that is sampled (e.g., scanned) can be aggregated according to a second sub-pattern similar to the second sub-frame 606 of FIGS. 6A and 6B. The dual coaxial LiDAR system can again consecutively sample the same one or more at periodic intervals over the same field-of-view or partially same field-of-view except this time the horizontal and vertical directions are slightly offset from the first sub-frame 604 and the second sub-frame 606. The field-of-view that is sampled (e.g., scanned) can be aggregated according to a third sub-pattern similar to the third sub-frame 608 of FIGS. 6A and 6B.

At optional block 814, the microcontroller can interlace the one or more sub-frames to form a frame with higher resolution. For example, as depicted in FIGS. 6A and 6B, the LiDAR system can interlace the first sub-frame 604, the second sub-frame 606, and the third sub-frame 608 to form a frame with a higher density of samples. A higher density of samples (of non-overlapping sample points) corresponds to a higher resolution. It should be appreciated that many of the sample points in the overlapping region 602 (FIG. 6A) of a dual coaxial LiDAR system (e.g., system 300) can have a higher density. As such, the resolution is higher in the overlapping region 602 shown in FIG. 6A.

Figure 9A:
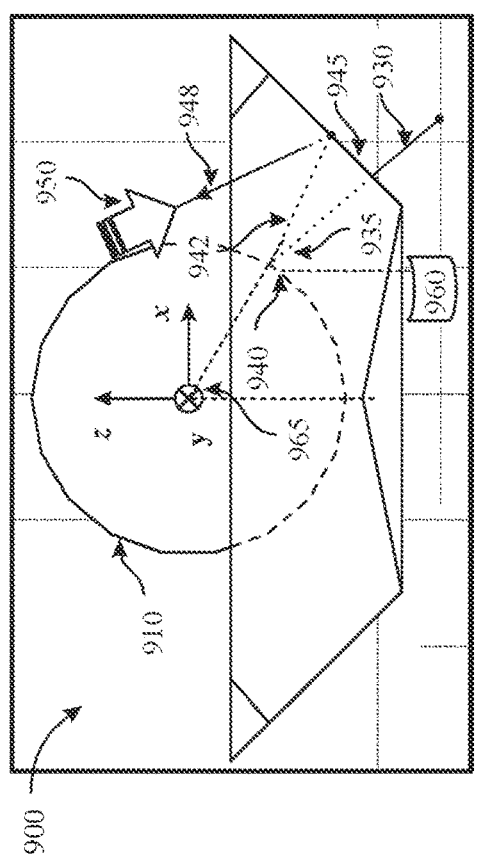
FIGS. 9A-9D illustrate different views of another embodiment of a beam steering apparatus, according to examples of the disclosure.
Figure 9B:
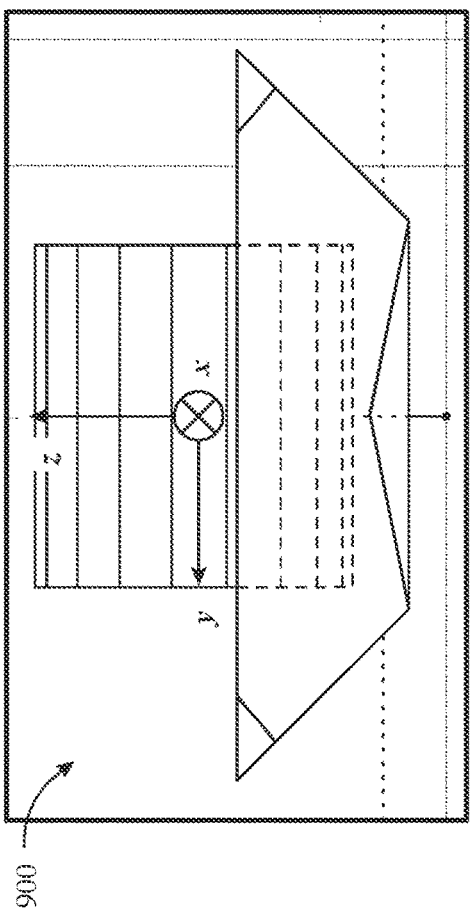
Figure 9C:
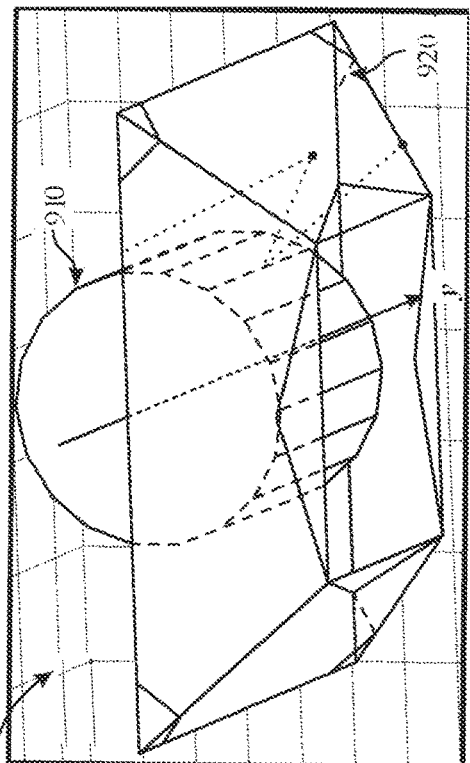
Figure 9D:
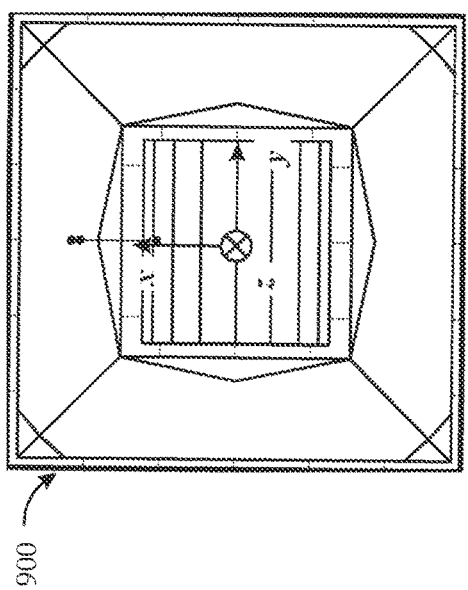

Beam steering apparatus 100 and 100' as depicted in FIGS. 2A-2B, 3, 4A-4B and 5 include polyhedron 102 that has six facets. As explained, a polyhedron can have any number of facets (e.g., more than six or less than six). FIGS. 9A-9D illustrate different views of another exemplary embodiment of a beam steering apparatus 900. Beam steering apparatus 900 can have a polyhedron with a number of facets that is more than six. Beam steering apparatus 900 can be used for performing one or more steps of process 800 and/or 1900 (e.g., steering light pulses in blocks 1904 and 1910 shown in FIG. 19). FIG. 9A illustrates a perspective view of beam steering apparatus 900; FIG. 9B illustrates a side view of beam steering apparatus 900 along the positive y axis direction; FIG. 9C illustrates a rear view of beam steering apparatus 900 along the positive z axis direction; and FIG. 9D illustrates a side view of beam steering apparatus 900 along the positive x axis direction. With reference to FIGS. 9A-9D, a polyhedron 910 can include a plurality of (e.g., 18) side-facets parallel to the y-axis of polyhedron 910. In some embodiments, polyhedron 910 can be centered at and rotates about or along they-axis. That is, they-axis can be the axis of rotation of polyhedron 910. In some embodiments, each of the plurality of side-facets can be polished and can operate similar to a reflective surface (e.g., a mirror surface) for transmitting and collecting laser light.

With reference to FIGS. 9A-9D, beam steering apparatus 900 can also include a concave reflector 920. The concave reflector 920 can include a plurality of (e.g. four) flat or curved reflective surfaces (e.g., mirrors). In some embodiments, each of the flat or curved mirrors of concave reflector 920 can have a polygon shape (e.g., trapezoidal shape) or any other desired shape. In some embodiments, each of the flat or curved mirrors can have corners and/or bottom edges cut or trimmed such that the incident laser light can pass through concave reflector 920. For example, corners and/or bottom edges that are cut in concave reflector 920 are illustrated in FIGS. 9A-9D. In some embodiments, similar to the concave reflector 112 shown in FIG. 1B, the concave reflector 920 can rotate about or along the z-axis with a rotating speed being independent from that for the polyhedron 910. With reference to FIG. 9B, at an instantaneous position of the rotating polyhedron 910 and the rotating concave reflector 920, a beam of collimated one or more light pulses 930 can be directed towards facet 940 of the polyhedron 910 within the x-z plane at an angle 935 (e.g., an angle between the beam of collimated one or more light pulses 930 and the negative z direction).

Figure 10A:
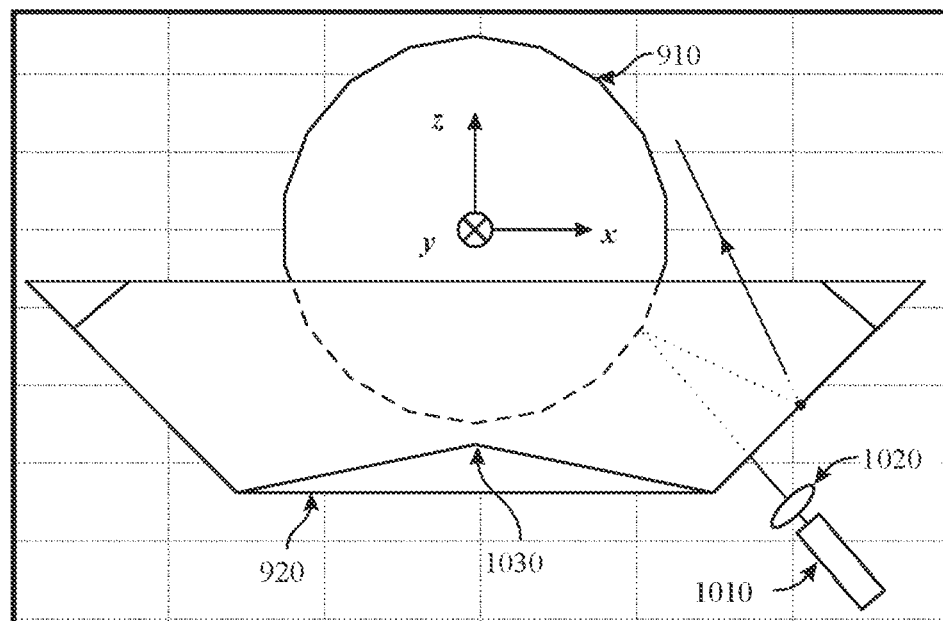
FIGS. 10A-10B illustrate various exemplary configurations for generating collimated illuminating laser beam, according to examples of the disclosure.

FIG. 10A illustrates one embodiment of a configuration for generating a collimated illuminating laser beam including one or more light pulses. As illustrated in FIG. 10A, a light source 1010 can direct one or more light pulses towards an optical lens 1020. In some embodiments, the optical lens 1020 and the light source 1010 can be configured to have a pre-determined distance such that an illuminating laser beam (e.g., a Gaussian beam) can be formed with a pre-determined beam divergence angle. The illuminating laser beam can be directed to a facet of polyhedron 910. The light source 1010 can be a fiber laser, semiconductor laser, or other types of laser light sources. Alternatively, other collimating optics, such as aspherical lens, compound lens, reflected spherical surface, reflected parabolic surface, or the like, can be used to generate the collimated laser beam. In some embodiments, the concave reflector 920 may be configured to have geometry parameter values such that the illuminating laser beam may be blocked or partially blocked at certain rotation angle by one or more reflective surfaces (e.g., mirrors) of the concave reflector 920. As discussed above, in concave reflector 920, a portion of the bottom edges of the one or more trapezoidal-shaped mirrors (e.g., cutout section 1030) can be cut off or exposed to allow the laser beam from a light source to pass through, as shown in FIG. 10A.

Figure 10B:
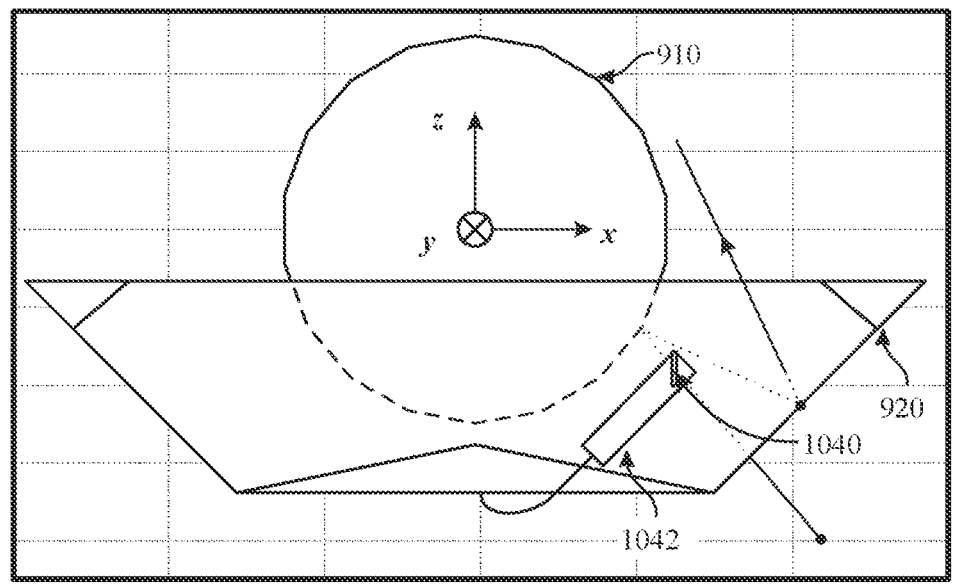

FIG. 10B illustrates another embodiment of a configuration for generating a collimated illuminating laser beam including light pulses. In this configuration, one or more light pulses can be generated by a light source (not shown in FIG. 10B) such as fiber laser, semiconductor laser, or other types of laser sources. The one or more light pulses can be delivered by an optical fiber 1042 and directed by a mirror 1040 towards a facet of the polyhedron 910. The light delivery configuration illustrated in FIG. 10B enables the optics (e.g., fibers, mirrors) to be placed inside of the concave reflector 920, therefore eliminating or reducing the need for cutting off edges of the concave reflector 920 (e.g., eliminating the cutout section 1030 as illustrated in FIG. 10A or reducing the size of the cutout section 1030).

With reference to FIGS. 9B and 10B, in some embodiments, the relative position and/or angle of a delivered laser beam (e.g., laser beam delivered by optical fiber 1042 and mirror 1040) to the axis of rotation of the reflective surfaces (e.g., polygon mirrors) polyhedron 910 can be configured in such a way that the effective LiDAR scanning range (e.g., horizontal and vertical scanning coverage angles) reaches the desired coverage values. In one example, the position and/or angle of the laser beam that reaches one of the facets of the polygon mirrors of polyhedron 910 is configured such that an angle 965 (shown in FIG. 9B) is approximately 59° from the vertical direction (e.g., negative z direction in FIG. 9B) to obtain about 100° of horizontal FOV and 25° of vertical FOV.

In some embodiments of light delivery configurations, the laser beam reaching the side facet of the polyhedron 910 may have different Gaussian beam parameters, such as beam waist widths and beam divergence angles, in the y-axis direction and the direction within the x-z plane. Different Gaussian beam parameters can be obtained by using one or more aspheric lenses or cylindrical lenses between the laser light source and a side facet of the polyhedron 910. In some embodiments, it is desired and beneficial to configure the lenses or other components of the LiDAR system such that the beam waist width is very narrow at the location where the laser beam reaches the side facet of the polyhedron 910. In one typical embodiment, a beam waist width of 0.45 mm can be obtained with approximately 0.060 divergence angle. A narrow or small laser beam waist (e.g., 0.2 mm) width can reduce the proportion or percentage of the polyhedron rotation positions where a portion of the light beam reaches two side facets simultaneously (e.g., a laser beam spot reaches two facets sharing a common edge) with respect to all polyhedron rotation positions that the light beam reaches. A light beam reaching two side facets simultaneously may be undesirable because it may cause difficulty to analyze the signal.

When the beam waist of the Gaussian beam in one direction is narrow, its beam divergence angle may become larger in this direction, which may be undesirable for certain embodiments. For example, for a Gaussian beam with 0.2 mm waist width, the divergence angle can be about 0.14°. To reduce the beam divergence angle, in some examples, polyhedron 910 can have curved facets with curved surfaces. In some embodiments, a curved surface can be used for the side facets of the polyhedron 910, as shown in FIG. 15A.

FIG. 15A illustrates multiple facets 1510A-C of an exemplary polyhedron 910 with curved surfaces. In FIG. 15A, the solid lines illustrate three of the multiple side facets of the polyhedron 910 if flat surfaces are used. The dashed lines illustrate the curved surfaces that can modify the Gaussian beam to reduce the beam divergence angle. While FIG. 15A illustrates curved surfaces as convex surfaces, a skilled artisan can appreciate that concave surfaces can also be used for some embodiments. In another embodiment, curved surfaces can also be used for the reflection surfaces (e.g., mirrors) of the concave reflector 920 (shown in FIGS. 9A-9D and 10A-10B) to modify the Gaussian beam.

In some embodiments, the portion of the polyhedron that reflects the illuminating laser beam can be configured to have one set of parameters (flat or curved surface, diameter, number of facets), while the remaining portion of the polyhedron that collects the returning light can be configured to have a different set of parameters. FIG. 15B illustrates the top view of one such embodiment, where the portion of the polyhedron 910 that reflects the illuminating or transmitting laser beam has curved surfaces (e.g., facets 1520A-C) and a larger diameter, while the remaining portion of the polyhedron that collects the returning light has flat surfaces with smaller diameter (e.g., facets 1522A-C). Both portions of the polyhedron 910 can have the same number (e.g., eighteen) facets. FIG. 15C illustrates the side view of this embodiment of polyhedron 910, which include facets 1520A-N having curved surfaces for reflecting the illuminating or transmitting laser beam and include facets 1522A-N having flat surfaces for collecting the returning light.

FIG. 15D illustrates a top view of another embodiment of polyhedron 910. As illustrated in FIG. 15D, the portion of the polyhedron that reflects the illuminating laser beam can have a first number (e.g., eighteen) facets (e.g., facets 1540A-D) with curved surfaces and a larger diameter, while the portion that collects the returning light can have a second number (e.g., six) facets (e.g., facets 1542A-B) with flat surfaces and a smaller diameter. FIG. 10E illustrates the side view of this embodiment of polyhedron 910, which include facets 1540A-N having curved surfaces for reflecting the illuminating or transmitting laser beam and include facets 1542A-M having flat surfaces for collecting the returning light.

With reference to back FIGS. 9A and 9B, as discussed above, a beam of collimated one or more light pulses 930 can be directed towards one facet 940 of the polyhedron 910 within the x-z plane at an angle 935. The angle 935 can be configured such that the angle between the direction of the light pulses 930 of the illuminating laser beam and a direction of returning light incident to the returning light detector 960 is 2N times of the spanning angle of one side of the polyhedron 910. A spanning angle is the angle between the two radii that extend from the center of the polyhedron 910 to two neighboring edges of a facet. Thus, for an 18-facet polyhedron, the spanning angle is 20° (i.e., 360°/18=20°). In the exemplary embodiment in FIG. 9A through 9D, "N" may have value of 1 and angle 935 may have a value of 40° for the 18-facet polygon with the spanning angle of 20°. As illustrated in FIG. 9B, the one or more redirected light pulses 942 generated (e.g., reflected) from facet 940 are directed to a mirror 945 of the concave reflector 920, and in turn reflected by mirror 945 and redirected to the field-of-view as steered light pulses 948.

With reference to FIGS. 9A-9B, after the one or more steered light pulses 948 reach an object in the field-of-view, they can be reflected or scattered in multiple directions and a portion of the returning light pulses 950 can be reflected back to and is collected by the mirror 945. When the object is relatively far (for example, farther than 1 meter) from the LiDAR system, the returning light pulses 950 can be approximated as a collimated beam and is in a direction substantially parallel to, but in a reverse direction from, the original direction of the steered light pulses 948. The returning light pulses 950 can be redirected by the mirror 945 and propagate along the reverse direction from redirected light pulses 942 towards the polyhedron 910.

Figure 11:
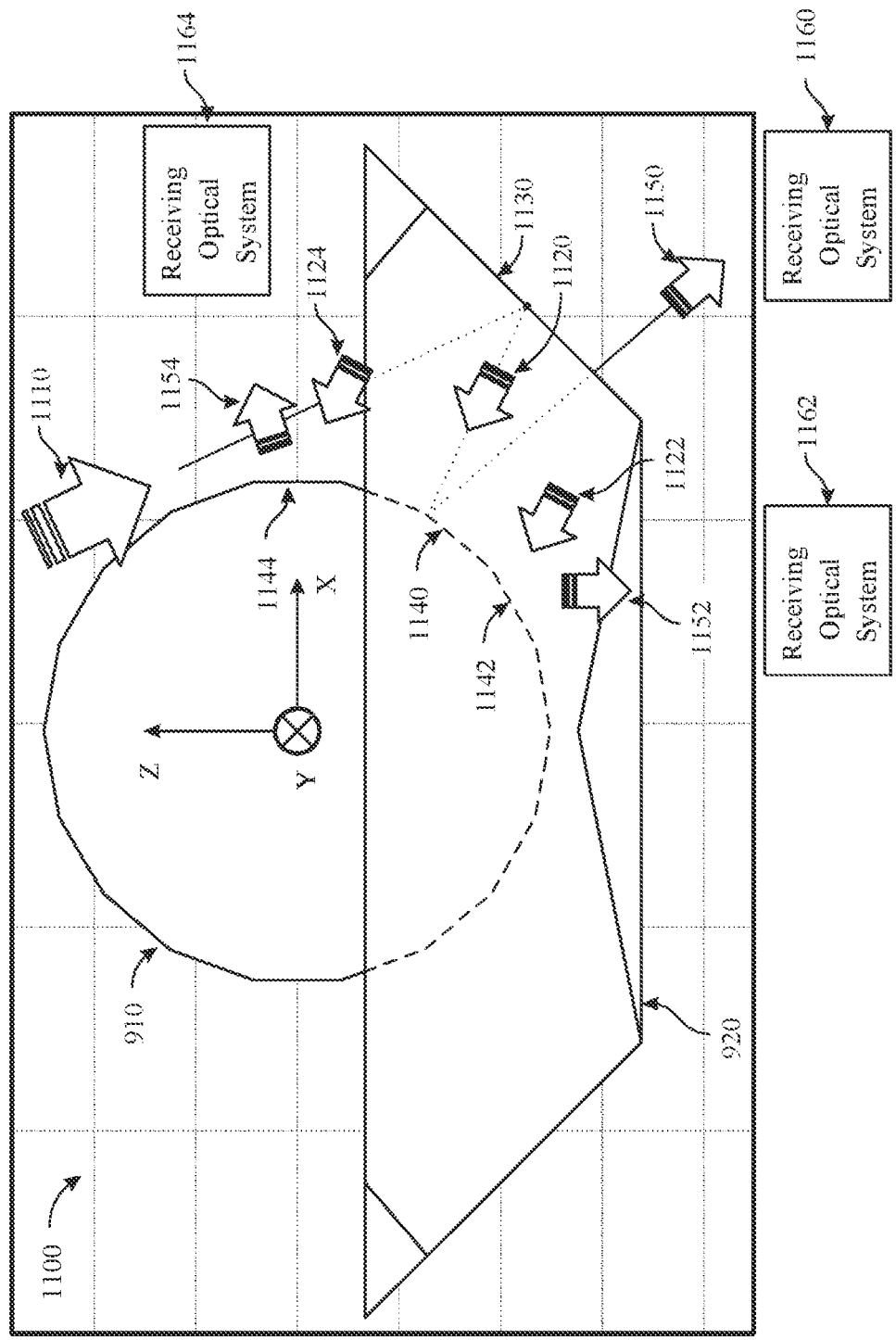
FIG. 11 illustrates exemplary configurations of a beam steering apparatus for increasing the receiving aperture and for collecting returning light pulses from different facets, according to examples of the disclosure.

FIG. 11 illustrates exemplary configurations of a beam steering apparatus 1100 for effectively increasing the receiving aperture and for collecting returning light pulses from different facets. With reference to FIGS. 9B and 11, the one or more returning light pulses 950 shown in FIG. 9B (e.g., the light pulses collected by the LiDAR system from light pulses scattered or reflected by the object in the field-of-view) can correspond to returning light pulses 1110 shown in FIG. 11. The returning light pulses 1110 may, for example, reach a reflective surface (e.g., mirror 1130) of the concave reflector 920. After the first reflection by the mirror 1130 of the concave reflector 920, the returning light pulses 1110 can be redirected towards the polyhedron 910. In some embodiments, the one or more returning light pulses 1110 may be scattered and may extend extensively in the directions perpendicular to the beam propagation. As a result, a substantial portion or the entire surface of the mirror 1130 may receive the one or more returning light pulses 1110 (except for the portion that is blocked by and in the shade of the polyhedron 910). Therefore, the one or more returning light pulses 1110 may be reflected by mirror 1130 to generate pulses of multiple portions of light that are directed to different facets of polyhedron 910. For example, as shown in FIG. 11, one portion of the returning light pulses 1120 propagating toward polyhedron 910 may reach facet 1140 (e.g., the same facet 940 shown in FIG. 9B) and may be reflected/redirected by facet 1140 as light pulses 1150; another portion of the returning light pulses 1122 propagating toward polyhedron 910 may reach a different facet 1142 and may be reflected/redirected by facet 1142 as light pulses 1152; yet another portion of the returning light pulses 1124 propagating toward polyhedron 910 may reach a different facet 1144 and may be reflected/redirected by facet 1144 as light pulses 1154.

With reference to FIG. 11, in some embodiments, the beams reflected/redirected by different facets of polyhedron 910 can be collected by different receiving optical systems (e.g., systems 1160, 1162, and 1164). For example, a first receiving optical system 1160 can be disposed in the path of light pulses 1150; a second receiving optical system 1162 can be disposed in the path of light pulses 1152, and so forth.

FIGS. 12A-12C illustrate exemplary configurations of receiving optic systems. With reference to FIGS. 12A, 12B, and 12C, a receiving optical system can comprise one refractive optical lens 1210 (shown in FIG. 12A), or one compound optical lens 1220 that comprises multiple optical elements (shown in FIG. 12B), or one compound focusing optics 1230 comprising one parabolic or spherical mirror and one refractive optical lens (shown in FIG. 12C). The refractive optical lenses shown in FIGS. 12A through 12C can be spherical or aspheric lenses, or the combination of both. Any of the receiving optical systems shown in FIGS. 12A-12C can focus the substantially parallel incoming light onto a detector element 1240, regardless of whether the pulses of the incoming light may have slightly tilting and diverging angles. Although three exemplary embodiments are listed in FIGS. 12A through 12C, it is appreciated that other configurations of receiving optical systems can be used to serve the same purpose.

The detector element 1240 illustrated in FIGS. 12A-12C can include an optical sensitive device that is capable of detecting optical signals and converting optical signals to electrical signals. FIG. 13A illustrates an exemplary embodiment of detector element 1240 for direct light collection using an optical sensitive device 1320. As shown in FIG. 13A, light pulses can propagate through an optional window 1310 and reach the optical sensitive device 1320, which converts the optical signals to electrical signals. The electrical signals can be further processed by electrical circuit elements on the electrical circuit board 1330 and can be converted to digital data for further processing. In some examples, optical sensitive device 1320 can include a refractive index matching material disposed on a surface of the optical sensitive device 1320. For example, optical sensitive device 1320 may include InGaAs material, the refractive index of which mismatches with air. Therefore, the refractive index matching material is disposed on the surface of the optical sensitive device 1320 to alleviate or eliminate the mismatch.

Figure 13B:
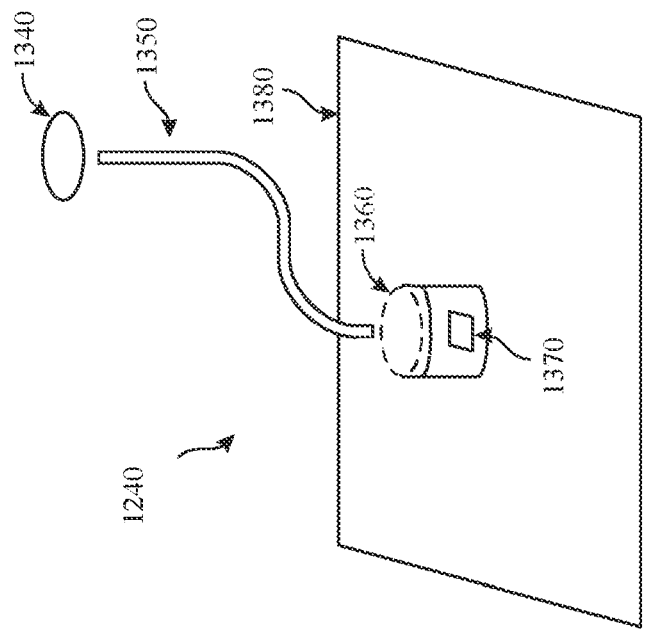
FIGS. 13A-13B illustrate exemplary detector elements for light collection using an optical sensitive device, according to examples of the disclosure.
Figure 13A:
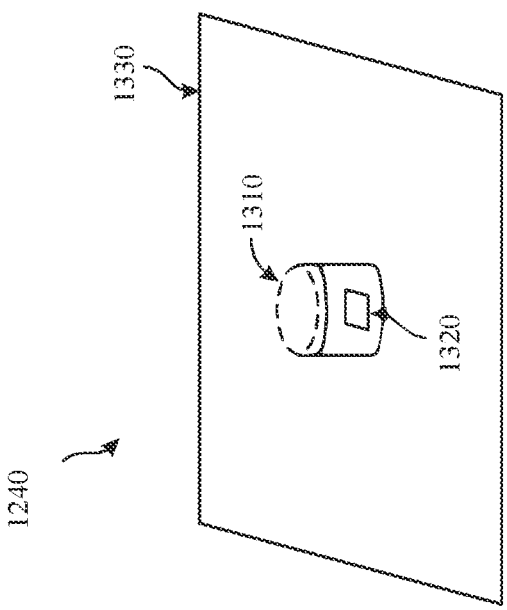

FIG. 13B illustrates another exemplary embodiment of detector element 1240 for light collection using an optical fiber 1350. As shown in FIG. 13B, the light pulses received by the optical sensitive device 1370 can first be focused by an optical device 1340 to the one end of an optical fiber 1350. The optical fiber 1350 can be a multi-mode fiber, or a single mode fiber, or a double cladding fiber where the light entering the fiber inner cladding slowly gets absorbed into the small core. In one embodiment, the light pulses exiting the other end of the optical fiber 1350 can be converged by an optical device 1360 to the optical sensitive device 1370, which can convert the optical signals to electrical signals. The optical device 1360 that converge the light signal coming out of the optical fiber 1350 can be an optical lens, a spherical or aspheric mirror, or direct coupling to the optical sensitive device 1370, with optional refractive index matching material disposed on the surface of device 1370 to improve the amount of light received by the optical sensitive device 1370. The electrical signals can be further processed by electrical circuit elements on the electrical board 1380. In this embodiment, the electrical devices (e.g., electrical board 1380) and/or the optical sensitive device 1370 can be disposed remotely (e.g., greater than 0.1 meter, greater than 1 meter, or even greater than 5 meters) from the beam steering apparatus 1100 shown in FIG. 11, so that the size of the beam steering apparatus 1100 can be reduced. For example, other than the light exiting end of the optical fiber 1350, beam steering apparatus 1100 can be configured to have a small physical dimension.

With reference back to FIG. 11, in another embodiment the receiving optical system 1160 can be disposed in the path of light pulses 1150. In another embodiment, the receiving optical system 1164 can be disposed in the path of light pulses 1154. In yet another embodiment two or more receiving optical systems (for example, both 1160 and 162, or all of 1160, 1162, and 1164) can co-exist in the LiDAR system. In one embodiment each of these receiving optical systems can be independent from each other, each having its own optical sensitive device. In another embodiment some or all of these receiving optical systems can share one optical sensitive device.

Figure 14A:
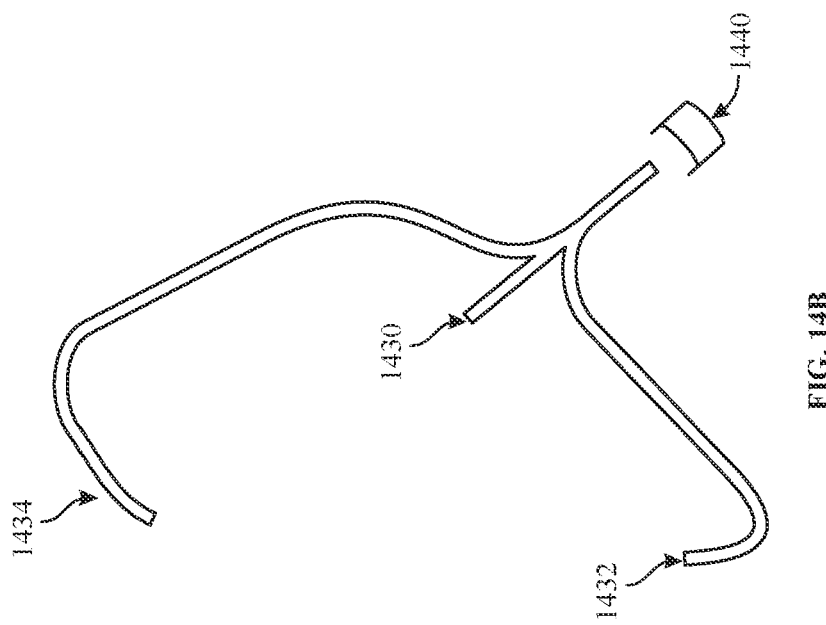
FIGS. 14A-14B illustrate exemplary configurations for combining light pulses from different facets using free-space optics or a combination of a fiber bundle and/or a power combiner, according to examples of the disclosure.
Figure 14B:
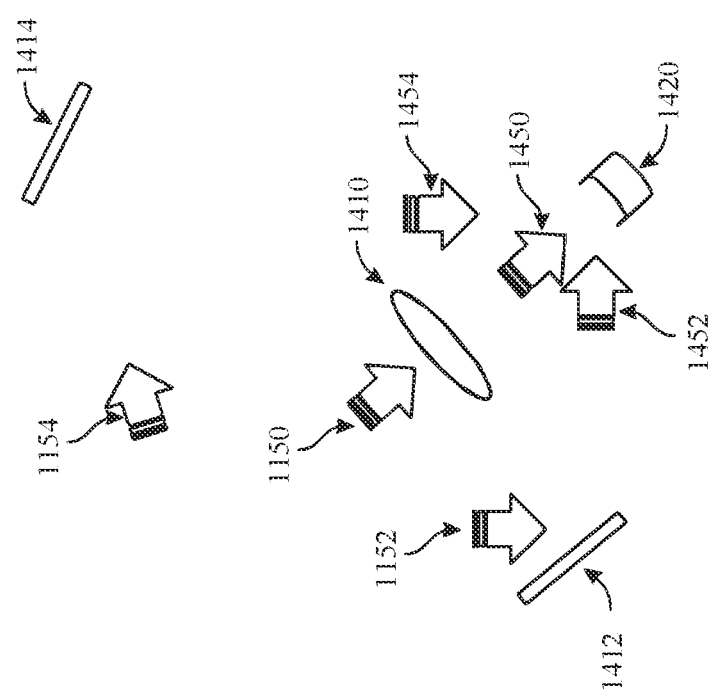

FIGS. 14A-14B illustrate exemplary configurations for combining redirected returning light pulses from different facets using free-space optics or a combination of a fiber bundle and/or a power combiner. As shown in FIG. 14A, in some embodiments, one optical sensitive device (e.g., device 1420) can be shared among multiple receiving optical systems. In such embodiments, the light pulses of beams coming from different directions can be redirected by multiple mirrors and focusing optics (e.g., optics 1410, 1412, and 1414) to the same optical sensitive device 1420. For example, light pulses 1150 can be focused by the focusing optics 1410 and subsequently become pulses of a focused light 1450 and reach the optical sensitive device 1420. Similarly, pulses of light pulses 1152 can be redirected and focused by the optics 1412 and subsequently become pulses of a focused light beam 1452 and reach the optical sensitive device 1420. Pulses of 1154 can be redirected and focused by the optics 1414 and subsequently become a focused light beam 1454 and reach the optical sensitive device 1420.

FIG. 14B illustrates another embodiment where one optical sensitive device 1440 is shared among multiple receiving optical systems. In this embodiment, pulses of each light coming from each different direction can be focused by an optical converging device (not shown in FIG. 14B). Subsequently, each of the focused light beams can be coupled into a receiving end of each of the three optical fiber channels 1430, 1432, and 1434, respectively. These three optical fiber channels can be combined together into one optical channel using, for example, a three-to-one optical combining device (e.g., a reverse fan-out fiber optics bundle). Subsequently, the light pulses transmitted from a transmitting end of the combined optical channel can be directed to one shared optical sensitive device 1440. In some embodiments. optical combining devices may not be used, and the light pulses transmitted from the transmitting end of the optical fiber bundle (e.g., a bundle of three optical fibers) can be directly focused onto one shared optical sensitive device.

Figure 18:
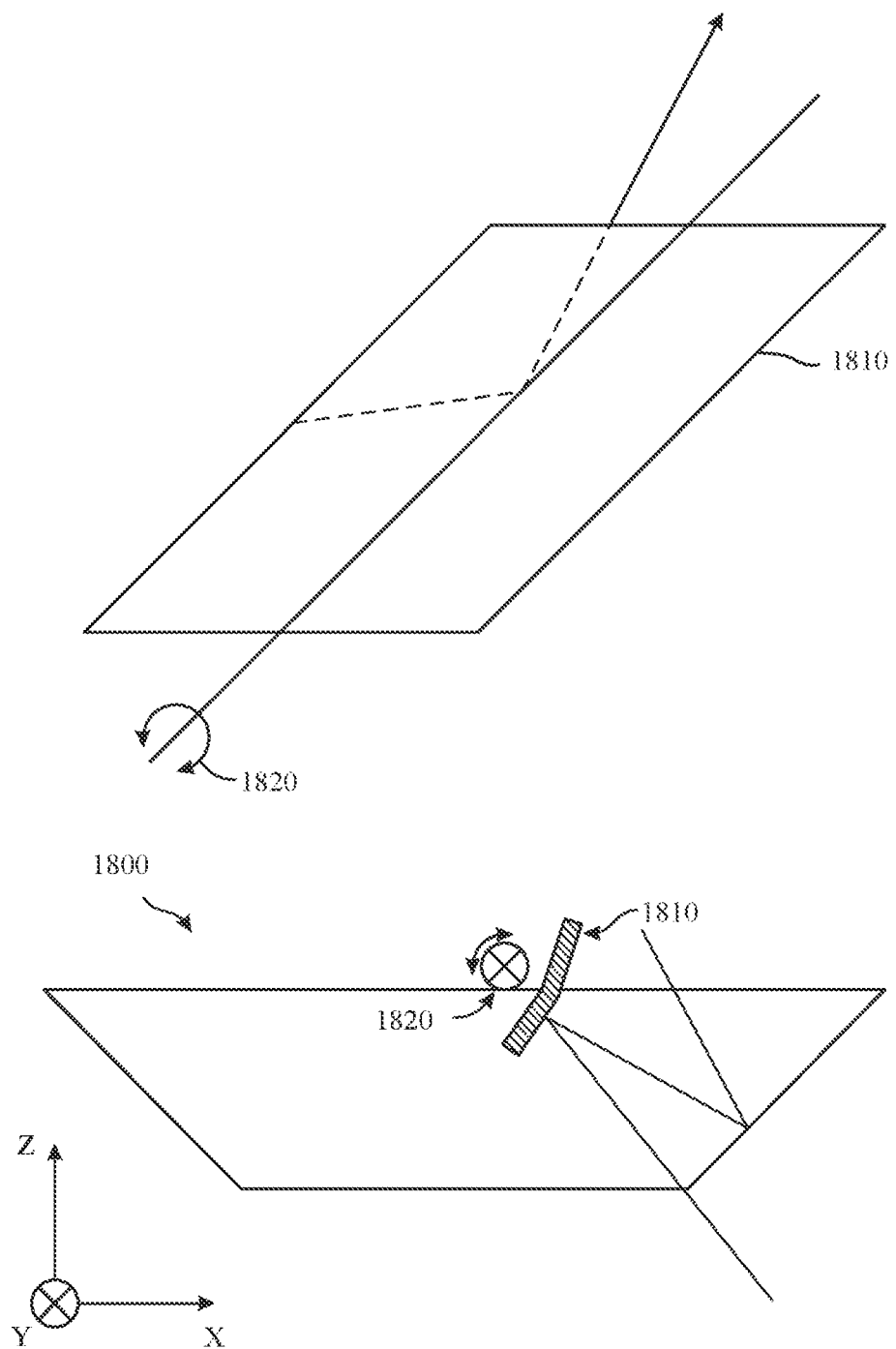
FIG. 18 illustrates another embodiment of a beam steering apparatus with an oscillating mirror, according to examples of the disclosure.

FIG. 18 illustrates another embodiment of a beam steering apparatus 1800 with an oscillating mirror. As shown in FIG. 18, instead of having a polyhedron 910 (shown in FIGS. 9A-9D), beam steering apparatus 1800 includes a one- or multiple-facet oscillation mirror 1810. For a multi-facet mirror, the neighboring facets can be at an angle similar to that of the neighboring facets of the polyhedron 910 shown in FIG. 11 (e.g., 20°). The mirror 1810 can oscillate back and forth along an axis 1820 that is parallel to, or along, the y-axis so that the pulses of a light beam illuminating at the one or more facets of mirror 1810 can be steered at different directions along the x-z plane. It is appreciated that similar to the embodiments described in FIGS. 15A through 15E for a polyhedron, the portion of the oscillating mirror 1810 that reflects the illuminating light pulses can be curved and/or can have different size from the portion of the oscillating mirror 1810 that collects the returning light pulses.

Figure 16:
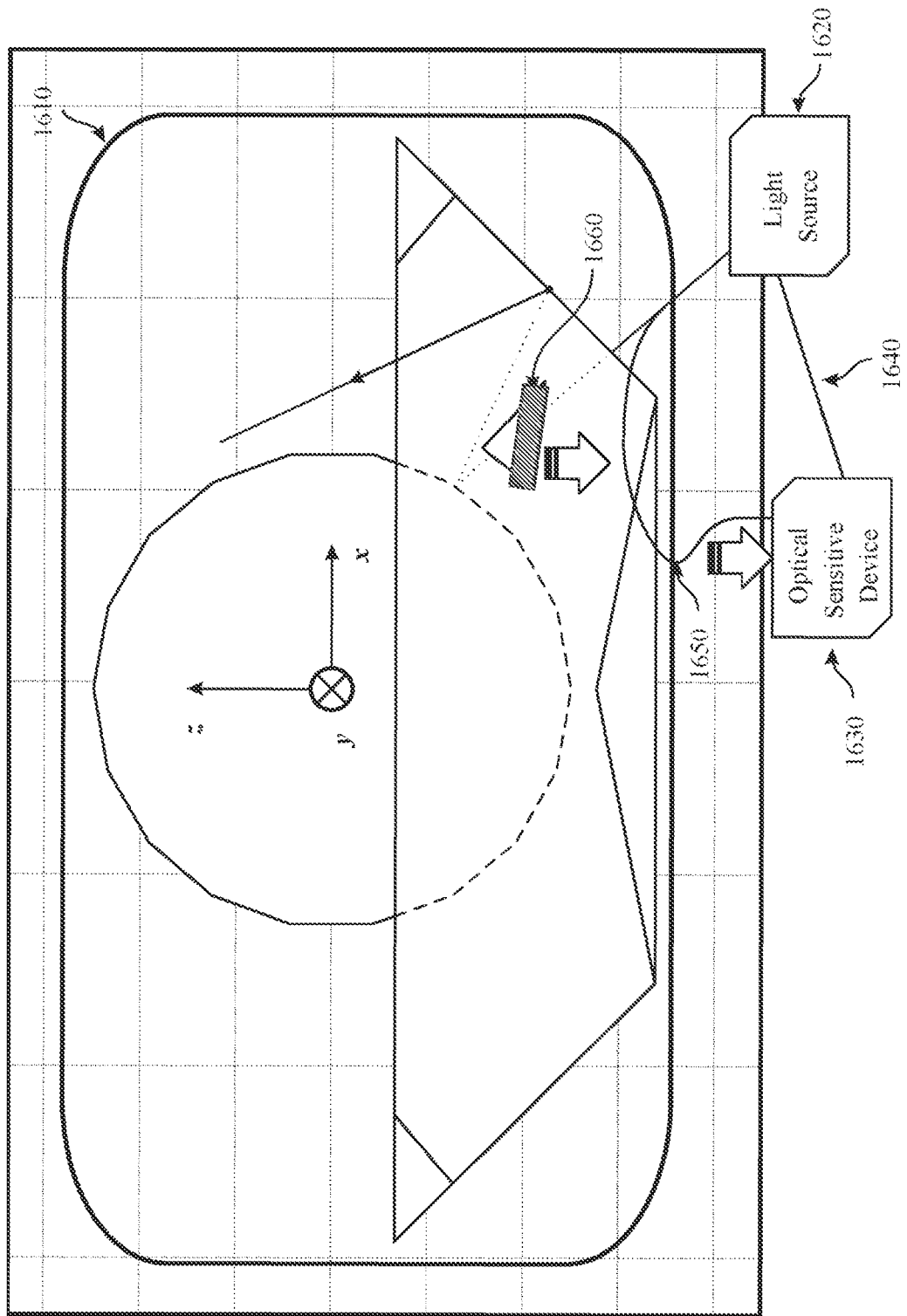
FIG. 16 illustrates an exemplary configuration of a LiDAR system for determining the time-of-flight of a light pulse, according to examples of the disclosure.

With reference back to FIG. 16, in some embodiments, to accurately determine the time-of-flight of a pulse (e.g., the time it takes from the pulse being transmitted out of the LiDAR system to being scattered/reflected by an object in the FOV and to being received by the detector of the LiDAR system), the time that the pulse is transmitted out of the LiDAR system needs to be determined. FIG. 16 illustrates an optical beam steering apparatus 1610, a light source 1620, and an optical sensitive device 1630. Optical beam steering apparatus 1610 can be similar to or same as beam steering apparatus 100 illustrated in FIG. 1B, 4A, 4B, or 5, apparatus 900 illustrated in FIGS. 9A-9D; the light source 1620 can be similar to or same as the light source 220 illustrated in FIG. 2B, 2C, or 3, light source 1010 illustrated in FIGS. 10A and 10B; and the optical sensitive device 1630 can be similar to or same as those illustrated in FIGS. 12A-12C, 13A-13B, and 14A-14B. As discussed above, an optical sensitive device can include a light detection module to detect and convert received light signals.

With reference to FIG. 16, in one embodiment, the light source 1620 generates one or more light pulses based on an electrical trigger signal, which can be provided either from an outside signal source, or an internally generated signal source. In some embodiments, the time it takes between generating the electrical trigger signal and transmitting the one or more light pulses out of the light source 1620 can be considered as a constant from pulse to pulse (e.g., with negligible variations) and/or can be calibrated. This electrical trigger signal can be transmitted to the optical sensitive device 1630 via an electrical connection (e.g., a cable) 1640 and used to determine the reference time of a light pulse.

In some embodiments, an optical fiber 1650 can be used to direct a portion of the one or more light pulses transmitted out of the light source 1620. An optical splitter can be used to split a light pulse and obtain a portion of the light pulse as a reference signal. This portion can be any percentage of the total light pulse, such as 10%, 1%, 0.1%, or 0.0001%, or any desired percentage. This portion of the light pulse can be directed by the optical fiber 1650 to the optical sensitive device 1630 and used to determine the reference time of the light pulse transmitted out of the light source 1620.

Figure 17:
FIG. 17 illustrates a reference pulse and a received returning light pulse, according to examples of the disclosure.

In some embodiments, a reference pulse generation device 1660 can be disposed with optical beam steering apparatus 1610 to obtain a portion of a light pulse as a reference signal and redirect the portion to optical sensitive device 1630 after the light pulse is transmitted out of the light source 1620. This portion can be any percentage of the total light pulse, like 10%, 1%, 0.1%, or 0.0001%, or any desired percentage. A skilled artisan can appreciate that the reference pulse generation device 1660 shown in FIG. 16 is only an illustration; and any optics that can obtain a portion of one or more light pulses as reference signals and redirect them to optical sensitive device 1630 can be used. For example, reference pulse generation device 1660 can be a partial reflection device that reflect a portion of the light pulses to the optical sensitive device In the previous embodiments discussed with respect to FIG. 16, the reference signal (e.g., a reference light pulse) can be detected by the optical sensitive device 1630. With reference to FIG. 17, the reference signal is illustrated as reference pulse 1710. FIG. 17 also illustrates a returning light pulse 1720. The returning light pulse (e.g., a pulse that is reflected/scattered by an object in the FOV and received by optical sensitive device 1630) is illustrated as pulse 1720. Pulse 1720 may have a different intensity and pulse width from the reference pulse 1710. In some embodiments, pulses 1710 and 1720 may have a similar shape profile. In one embodiment, the reference pulse 1710 can be used as a template to match the received returning pulse 1720 to accurately determine the time difference (or TOF) between the returning pulse and the reference pulse. Based on the TOF, the distance of the object in the field-of-view can be determined.

Figure 19:
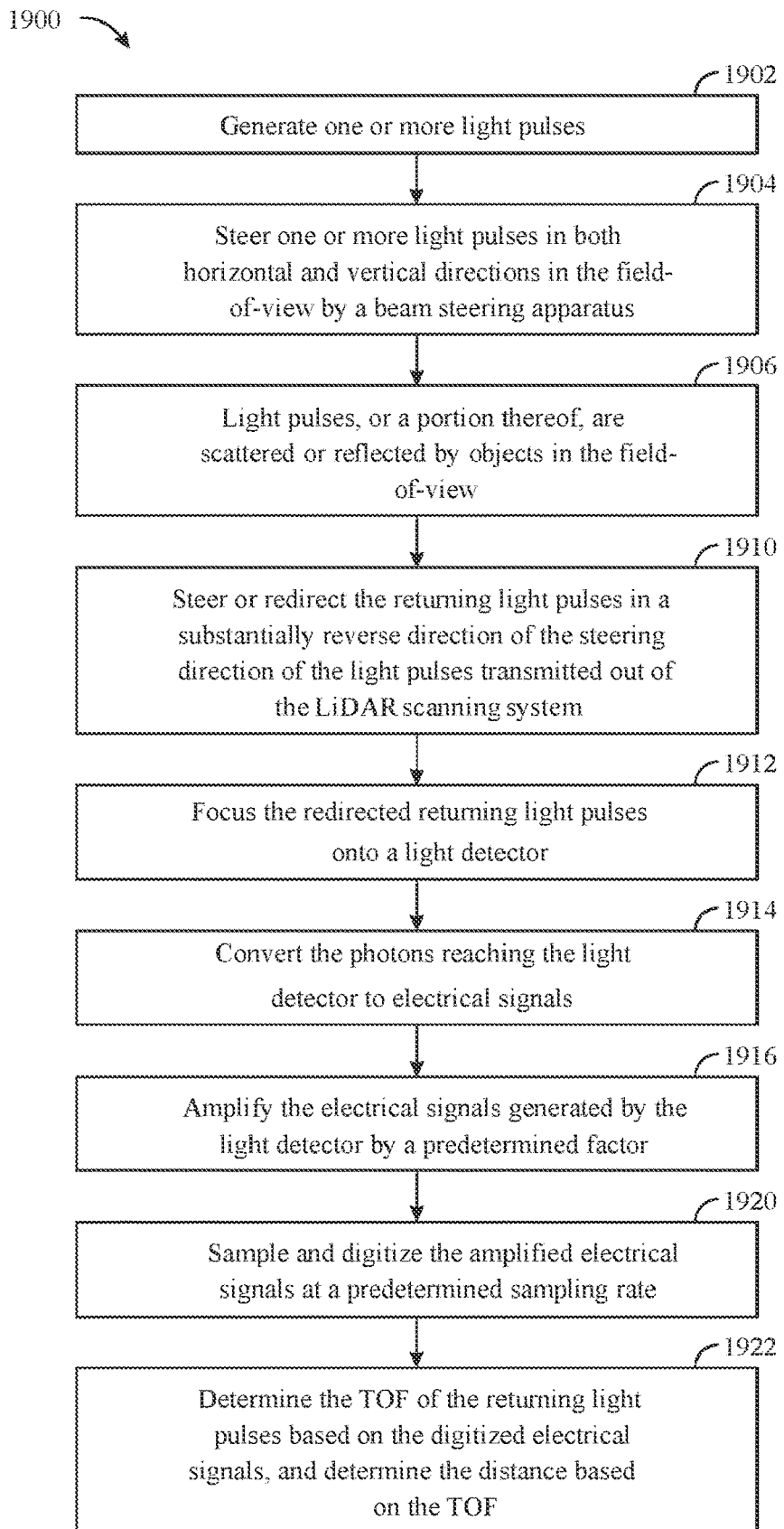
FIG. 19 illustrates an exemplary flow chart for a method of determining time of flight of one or more laser pulses, according to examples of the disclosure.

FIG. 19 illustrates an exemplary flow chart for a process of determining time of flight of one or more light pulses for generating a 3D image using a LiDAR scanning system (e.g., various systems depicted in FIGS. 1A-1B, 2A-2C, 3, 4A-4B, 5, 9A-9D, 10A-10B, and 11). With reference to FIG. 19, at block 1902, one or more light pulses (e.g., short laser light pulses having a pulse width of about 0.01 nanosecond to 5 nanoseconds or light pulses having a pulse width of 5 nanoseconds to 30 nanoseconds or longer) can be generated from a light source of the LiDAR scanning system. At block 1904, a beam steering apparatus can steer or scan the one or more light pulses across the field-of-view in both horizontal and vertical directions. At block 1906, one or more light pulses, or a portion thereof, illuminate or reach an object and are scattered or reflected in one or more directions. In some embodiments, a portion of the scattered or reflected light pulses can return to the LiDAR scanning system and reach a collection aperture of a detector of the LiDAR scanning system.

At block 1910, the one or more returning light pulses can be steered or redirected in a direction that is substantially reverse to the steering direction of, and substantially parallel to, the light pulses transmitted out of the LiDAR scanning system. At block 1912, the one or more redirected returning light pulses can be focused onto a light detector of a receiving optical system. At block 1914, the light detector converts photons of the redirected returning light pulses that reach the light detector to one or more electrical signals. At block 1916, one or more output electrical signals generated by the light detector can be amplified using an amplification circuit or device by a predetermined factor. At block 1920, the amplified one or more electrical signals can be sampled and converted to a digital value at a predetermined sampling rate. In some embodiments, the digitized signal data can be collected within a time period of the expected maximum TOF corresponding to the farthest object in the field-of-view. At block 1922, the digitized signal data can be analyzed to determine the TOF of one or more returning light pulses, and determine the distance from the LiDAR scanning system to the reflection or scattering points of the objects.

It is understood that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C. § 112(f) unless the element is expressly recited using the phrase "means for."

What is claimed is:

1. A light detection and ranging (LiDAR) scanning system, comprising:
   one or more light sources configured to provide one or more light pulses; and
   a beam steering apparatus optically coupled to the one or more light sources to receive the one or more light pulses;
   the beam steering apparatus comprising a light beam steering device and a reflector having a plurality of reflective surfaces,
      wherein the light beam steering device is configured to direct the one or more light pulses to the reflector,
      wherein the reflector is configured to redirect, upon receiving the one or more light pulses from the light beam steering device, the one or more light pulses to a field-of-view, and
      wherein a combination of the reflector and the light beam steering device, when moving with respect to each other, is configured to:
         scan the one or more light pulses both vertically and horizontally to illuminate an object within the field-of-view, and
         receive return light formed based on the illumination of the object within the field-of-view, and
         direct the return light to a detector,
      and wherein the light beam steering device is configured to oscillate between two end vertical positions to obtain multiple scanlines in-between.

2. The LiDAR scanning system of claim 1, wherein the light beam steering device is an oscillation mirror.

3. The LiDAR scanning system of claim 2, wherein the oscillation mirror is operative to oscillate about a first axis and the reflector is operative to rotate about a second axis, wherein the combination of the oscillation mirror and the reflector, when moving based on their respective axes, coaxially illuminates the object using the one or more light pulses and receives the return light.

4. The LiDAR scanning system of claim 2, wherein the oscillation mirror is a one-facet mirror.

5. The LiDAR scanning system of claim 2, wherein the oscillation mirror is a multiple-facet mirror.

6. The LiDAR scanning system of claim 1, further comprising one or more optics disposed between the one or more light sources and the light beam steering device, the one or more optics facilitating directing the one or more light pulses to the light beam steering device.

7. The LiDAR scanning system of claim 1, wherein an angle between any two adjacent reflective surfaces of the plurality of reflective surfaces is other than a 90-degree angle.

8. The LiDAR scanning system of claim 1, wherein the reflector is a polygonal-shaped structure.

9. The LiDAR scanning system of claim 1, wherein the one or more light pulses form two beams of light pulses comprising a first light beam and a second light beam, and wherein the beam steering apparatus scans the first light beam in a first range within the field-of-view and scans the second light beam in a second range within the field-of-view, the first range and the second range overlap.

10. The LiDAR scanning system of claim 1,
wherein the reflector is further configured to direct the return light to the light beam steering device, and
wherein the light beam steering device is further configured to direct, upon receiving the return light from the reflector, the return light to a detector.

11. A light detection and ranging (LiDAR) system, comprising:
one or more light sources configured to generate one or more light beams;
a beam scanner configured to scan a field-of-view of the LiDAR system using the one or more light beams, the beam scanner comprising a planar mirror and a polygon mirror comprising a plurality of reflective surfaces,
wherein the planar mirror is pivotable along a first axis to direct the one or more light beams to the polygon mirror,
wherein the polygon mirror is rotatable about a second axis orthogonal to the first axis to redirect the one or more light beams to a field-of-view, and
wherein the beam scanner is optically coupled to the one or more light sources and is positioned to:
scan the one or more light beams both vertically and horizontally to illuminate an object within the field-of-view of the LiDAR system,
receive return light formed based on the illumination of the object within the field-of-view, and
direct the return light to a detector,
and wherein the planar mirror is configured to oscillate between two end vertical positions to obtain multiple scanlines in-between.

12. The LiDAR system of claim 11, wherein the plurality of reflective surfaces comprises four or more reflective surfaces.

13. The LiDAR system of claim 11, wherein the polygon mirror is operative to rotate about a polygon mirror axle, the polygon mirror axle extending into a block of the polygon mirror through two opposing non-reflective surfaces of the block.

14. The LiDAR system of claim 11, wherein:
the one or more light beams comprise a first light beam and a second light beam,
the first light beam and the second light beam are scanned by the beam scanner to define a first field-of-view and a second field-of-view, respectively,
the first field-of-view and the second field-of-view, in combination, define the field-of-view of the LiDAR system, and
the first field-of-view and the second field-of-view partially overlap to define an overlap region within the field-of-view of the LiDAR system.

15. The LiDAR system of claim 11, wherein:
the one or more light beams comprise a first light beam and a second light beam, and
each of the first light beam and second light beam is scanned by the beam scanner to define a respective partial field-of-view of approximately 60 degrees wide in one direction.

16. The LiDAR system of claim 11, wherein the polygon mirror is further configured to direct the return light to the planar mirror, and
wherein the planar mirror is further configured to direct the return light to the detector.

17. A light detection and ranging (LiDAR) system, comprising:
one or more light sources configured to generate one or more light beams;
a beam scanner configured to scan a field-of-view of the LiDAR system using the one or more light beams, the beam scanner comprising a polygon mirror and a second mirror,
wherein the polygon mirror comprises a plurality of reflective surfaces and is rotatable about a polygon mirror axle to direct the one or more light beams to the second mirror,
wherein the second mirror is pivotable along an axis orthogonal to the polygon mirror axle to direct the one or more light beams to a field-of-view, and
wherein the beam scanner is optically coupled to the one or more light sources and is positioned to:
scan the one or more light beams both vertically and horizontally to illuminate an object within the field-of-view of the LiDAR system,
receive return light formed based on the illumination of the object within the field-of-view, and
direct the return light to a detector,
and wherein the second mirror is configured to oscillate between two end vertical positions to obtain multiple scanlines in-between.

18. The LiDAR system of claim 17, wherein the plurality of reflective surfaces comprises four or more reflective surfaces.

19. The LiDAR system of claim 17, wherein:
the one or more light beams comprise a first light beam and a second light beam,
the first light beam and the second light beam are scanned by the beam scanner to define a first field-of-view and a second field-of-view, respectively,
the first field-of-view and the second field-of-view, in combination, define the field-of-view of the LiDAR system, and
the first field-of-view and the second field-of-view partially overlap to define an overlap region within the field-of-view of the LiDAR system.

20. The LiDAR system of claim 17, wherein the second mirror is further configured to direct the return light to the polygon mirror, and
wherein the polygon mirror is further configured to direct the return light to the detector.

21. A method for performing LiDAR scanning using a LiDAR system, comprising:

directing one or more light pulses from one or more light sources to a beam steering apparatus optically coupled to the one or more light sources, the beam steering apparatus comprising a light beam steering device and a reflector having a plurality of reflective surfaces;

directing, by the light beam steering device of the beam steering apparatus, the one or more light pulses toward the reflector, upon receiving the one or more light pulses from the light beam steering device, directing, by the reflector, the one or more light pulses to a field-of-view, wherein the one or more light pulses are steered by a combination of the light beam steering device and the reflector both vertically and horizontally to illuminate an object within the field-of-view, receiving return light formed based on the illumination of the object within the field-of-view, and directing the return light to a detector, wherein the light beam steering device is configured to oscillate between two end vertical positions to obtain multiple scanlines in-between.

22. The method of claim 21, wherein the one or more light pulses form two beams of light pulses comprising a first light beam and a second light beam, wherein the one or more light pulses are steered by scanning the first light beam in a first range within the field-of-view and scanning the second light beam in a second range within the field-of-view, the first range and the second range overlap.

23. The LiDAR system of claim 21, wherein directing the return light to the detector comprises:

directing, by the reflector, the return light to the light beam steering device, and directing, upon the light beam steering device receiving the return light from the reflector, the return light to a detector.

* * * * *